United States Patent
Hayakawa et al.

(10) Patent No.: US 9,919,817 B2
(45) Date of Patent: Mar. 20, 2018

(54) DRINK FILLING METHOD AND APPARATUS

(75) Inventors: Atsushi Hayakawa, Tokyo (JP); Yuiko Nakamura, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 600 days.

(21) Appl. No.: 14/232,413

(22) PCT Filed: Aug. 1, 2012

(86) PCT No.: PCT/JP2012/069544
§ 371 (c)(1),
(2), (4) Date: Jan. 13, 2014

(87) PCT Pub. No.: WO2013/021882
PCT Pub. Date: Feb. 14, 2013

(65) Prior Publication Data
US 2014/0144105 A1 May 29, 2014

(30) Foreign Application Priority Data

Aug. 5, 2011 (JP) .................................. 2011-172335
Aug. 5, 2011 (JP) .................................. 2011-172336

(51) Int. Cl.
*B29C 49/06* (2006.01)
*B29C 49/28* (2006.01)
(Continued)

(52) U.S. Cl.
CPC .......... *B65B 3/022* (2013.01); *B29C 49/4252* (2013.01); *B67C 7/0073* (2013.01);
(Continued)

(58) Field of Classification Search
CPC ............... B29C 49/28; B29C 49/4252; B29C 2049/4682; B29C 49/68; A61L 2/04; A61L 2/208; A61L 2/16
(Continued)

(56) References Cited

U.S. PATENT DOCUMENTS 5,377,475 A * 1/1995 Haarer .................... B65B 55/04
422/28
6,562,281 B1 * 5/2003 Marchau ................... A61L 2/22
264/532

(Continued)

FOREIGN PATENT DOCUMENTS

EP 2138298 12/2009
JP 2001-039414 2/2001
(Continued)

OTHER PUBLICATIONS

International Search Report, PCT/JP2012/069544, dated Nov. 13, 2012.
(Continued)

*Primary Examiner* — Thanh Truong
*Assistant Examiner* — Patrick Fry
(74) *Attorney, Agent, or Firm* — Young & Thompson

(57) ABSTRACT

Bottles are appropriately sterilized in an inline system. While continuously traveling preheated preforms (1), the preform is preliminarily heated, hydrogen peroxide mist (M) or gas is blasted to the preheated preform, the preform is heated to a temperature suitable for molding the preform, the preform is molded in a blow-molding mold (4), which is continuously traveling together with the preform, into a container (2), the container taken out of the mold is filled with drink while being continuously traveled and then applied with a lid to seal the container.

8 Claims, 15 Drawing Sheets

(51) Int. Cl.
*B29C 49/42* (2006.01)
*B29C 49/46* (2006.01)
*B65B 3/02* (2006.01)
*B67C 3/22* (2006.01)
*B67C 7/00* (2006.01)

(52) U.S. Cl.
CPC ............ *B29C 49/06* (2013.01); *B29C 49/28* (2013.01); *B29C 2049/4682* (2013.01); *B67C 2003/227* (2013.01)

(58) Field of Classification Search
USPC .................................................. 53/453, 559
See application file for complete search history.

(56) References Cited

U.S. PATENT DOCUMENTS

| | | | |
|---|---|---|---|
| 6,692,684 B1 | 2/2004 | Nantin et al. | |
| 6,919,043 B2 | 7/2005 | Hayakawa et al. | |
| 6,976,836 B2* | 12/2005 | Suzuki | B29C 49/4205 264/538 |
| 7,806,680 B2* | 10/2010 | Adriansens | A61L 2/04 422/304 |
| 8,083,512 B2* | 12/2011 | Adriansens | A61L 2/04 422/303 |
| 8,092,757 B2* | 1/2012 | Adriansens | A61L 2/208 264/252 |
| 8,470,240 B2* | 6/2013 | Quetel | A61L 2/04 422/28 |
| 9,254,343 B2* | 2/2016 | Herold | A61L 2/208 |
| 9,403,330 B2* | 8/2016 | Laumer | B29C 49/4205 |
| 2001/0010145 A1* | 8/2001 | Tawa | B65B 3/022 53/425 |
| 2003/0165400 A1 | 9/2003 | Hayakawa et al. | |
| 2004/0208781 A1* | 10/2004 | Hayashi | A61L 2/06 422/28 |
| 2005/0226796 A1 | 10/2005 | Hayakawa et al. | |
| 2007/0253863 A1* | 11/2007 | Iwashita | A61L 2/22 422/28 |
| 2009/0110613 A1 | 4/2009 | Naka et al. | |
| 2009/0317506 A1* | 12/2009 | Adriansens | A61L 2/04 425/103 |
| 2010/0047120 A1 | 2/2010 | Adriansens et al. | |
| 2010/0244298 A1* | 9/2010 | Mie | B29C 49/4205 264/40.7 |
| 2011/0061343 A1 | 3/2011 | Roithmeier et al. | |
| 2011/0272861 A1 | 11/2011 | Humele | |
| 2013/0078327 A1* | 3/2013 | Adriansens | B29C 49/46 425/210 |
| 2014/0119988 A1* | 5/2014 | Herold | A61L 2/208 422/28 |
| 2014/0311095 A1* | 10/2014 | Hayakawa | B65B 55/10 53/426 |
| 2016/0257054 A1* | 9/2016 | Hayakawa | B29C 49/06 |

FOREIGN PATENT DOCUMENTS

| | | |
|---|---|---|
| JP | 3903411 | 1/2007 |
| JP | 2008-546605 | 12/2008 |
| JP | 2009-107633 | 5/2009 |
| JP | 2009-274740 | 11/2009 |
| JP | 2010-189023 | 9/2010 |
| JP | 2010-235209 | 10/2010 |
| WO | 9951497 | 10/1999 |
| WO | 2010052068 | 5/2010 |
| WO | 2010090247 | 8/2010 |

OTHER PUBLICATIONS

Japanese Office Action for Application Serial No. 2015-230662 dated Dec. 6, 2016.
Japanese Office Action for Application Serial No. 2015-230660 dated Dec. 20, 2016.

* cited by examiner

FIG.9
(A)
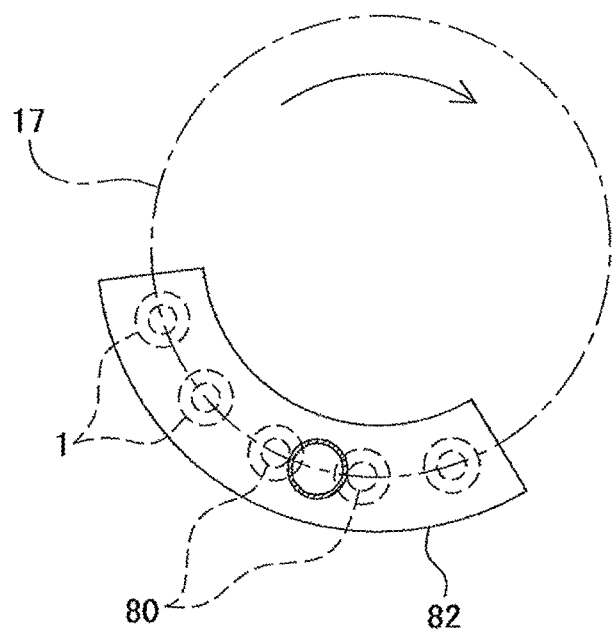
(B)
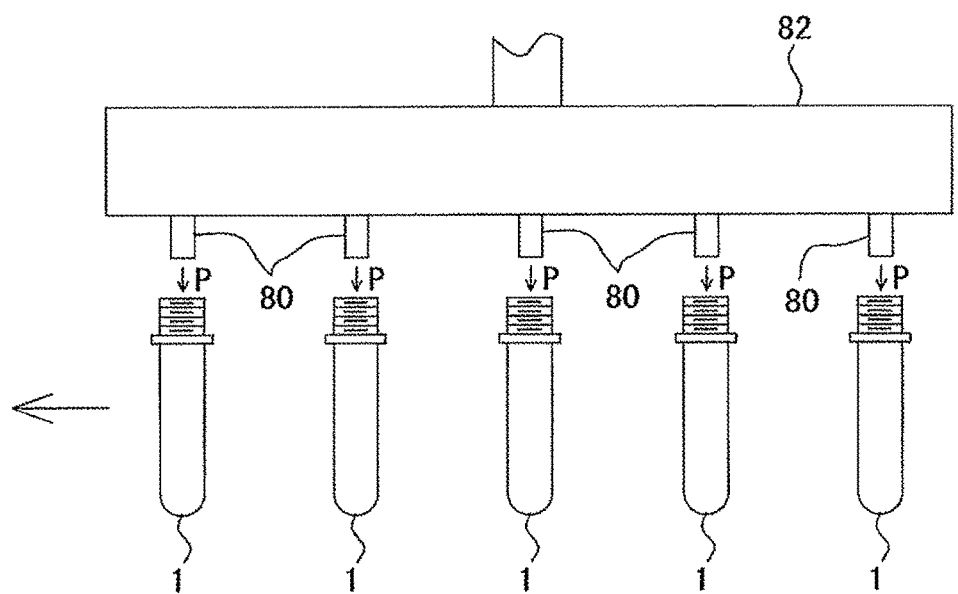

FIG.10 (F) hydrogen peroxide throw directly upper portion

DRINK FILLING METHOD AND APPARATUS

FIELD OF THE INVENTION

The present invention relates to a drink filling method and a drink filling apparatus.

BACKGROUND ART

As a conventional technology, there is provided an aseptic filling method as an inline system, in which sterilizing agent such as hydrogen peroxide or like is blasted to a preform while conveying the preform, the preform is then heated to activate the sterilizing agent adhering to the surface of the preform to a temperature suitable for molding, the thus heated preform is thereafter molded into a bottle, the bottle is then filled with drink, and a cap is applied to the bottle, thereby forming an aseptic package (for example, refer to Patent Documents 1 and 2).

PRIOR ART DOCUMENT

Patent Document

Patent Document 1: Japanese Patent No. 2008-546605
Patent Document 2: Japanese Patent Publication No. 3903411

SUMMARY OF THE INVENTION

Problem to be Solved by the Invention

The conventional technology mentioned above relates to a method of performing sterilization treatment in a state of preform before bottle molding process in place of sterilization treatment after bottle molding process. In the above technology, since the preform is merely heated after blasting hydrogen peroxide mist to the preform, there remains a fear of causing defective in the sterilization. Moreover, in order to prevent such defective sterilization, it may be considered to blast much amount of hydrogen peroxide mist in the state of the preform. However, if much amount of the hydrogen peroxide mist in this state is blasted, defective molding such as whitening, strain, unevenness in molding, or like will be liable to occur to the bottle during the heating and blow-molding processes of the preform.

Moreover, in the conventional technology mentioned above, the sterilization treatment is performed in the state of the preform before the bottle molding process in place of the sterilization treatment after the bottle molding process. Therefore, there is a fear such that bacteria or like is mixed into the bottle during the blow molding process by highly pressurized air or the bottle conveying period to a filling area. Because of such reason, there is a possibility of producing a package which was not sufficiently sterilized.

Although it is not impossible to sterilize all the high-pressure air circuit, a stretching rod, and a mol provided in the blow molding machine or all the bottle conveying area before manufacturing bottles and to maintain aseptic condition or environment, in such case, it becomes necessary to additionally locate sterilization equipment or like, and to exchange many structural components with ones made of a material having anti-medical property, which requires much initial investment.

Furthermore, in a case where the preform is formed of a material having a relatively low heat-resisting property such as polyethylene-terephthalate, even if the preform to which the sterilizing agent adheres is heated in a state of being inserted into a mandrel or spindle, a mouth portion of the preform will be heated merely up to 40 to 50° C., so that the mouth portion is subjected to less sterilized effect compared to other portions of the preform, and it is hence difficult to obtain sufficient sterilized effect.

That is, if the mouth portion of the preform is heated much to a high temperature, there is a fear such that the mouth portion is deformed, which may give a damage to sealing performance inside the bottle when a cap is applied thereto. Accordingly, it is necessary to restrict the heating temperature to the mouth portion to be such temperature as of 40 to 50° C., and therefore, there is a possibility of producing a package having less sterilized effect.

An object of the present invention is to solve the above problems.

Means for Solving the Problem

In order to achieve the above object, the present invention adopts the following structure or configuration.

Further, in the following, although reference numerals are added with parentheses for easy understanding of the present invention, the present invention is not limited thereto.

That is the invention in a first embodiment adopts a drink filling method which comprises: preheating a preform (1), blasting hydrogen peroxide mist (M) or gas to the preheated preform (1), and further heating the preform (1) to a temperature suitable for molding the preform, the above processes being performed in the state of the preform (1) while being continuously travelled; molding the preform (1) into a container (2) in a blow-molding mold (4) which is also travelling together; taking the container (2) out of the blow-molding mold (4); and filling the container (2) with drink (a) and then sealing the container (2) with a cap (3) while the container being continuously travelled.

The invention according to another embodiment adopts a drink filling method which comprises: preheating a preform (1) to a temperature suitable for preliminary sterilization, blasting hydrogen peroxide mist (M) or gas to the preheated preform (1) so as to perform the preliminary sterilization thereof, and further heating the preform (1) to a temperature suitable for molding the preform, the above processes being performed under a state of the preform (1) being continuously travelled; molding the preform (1) into a container (2) in a blow-molding mold (4) which is also travelling together; taking the container (2) out of the blow-molding mold (4); performing a main sterilization to the container (2) taken out of the mold (4) while being continuously travelling; and filling the mainly sterilized container (2) with drink (a) and then sealing the container (2) with a cap (3) while the container being continuously travelled.

It is also possible to perform all the steps from the preheating of the preform (1) to the heating of the preform to the temperature suitable for the molding step within a heating furnace (50).

Alternatively, it is possible to perform all the steps from the preheating of the preform (1) to the blasting of the hydrogen peroxide mist or gas at a portion outside of a heating furnace (50) and to perform the heating of the preform (1) to a temperature suitable for the molding process within the heating furnace (50).

In a different embodiment, it is possible to perform the preheating and the preliminary sterilization to the preform (1) outside a heating furnace (50), and to perform the heating to a temperature suitable for the molding within the heating furnace (50).

Alternatively, one can perform the main sterilization by blasting the hydrogen peroxide mist or gas to the container (2) to which the heat after heating the preform (1) remains, and then to perform an air-rinsing by an aseptic air (N).

It is also possible to perform the main sterilization by rinsing the preform (1) with hot water (H).

Another embodiment comprises: a conveying path that continuously conveys a preform (1) or container (2) till the preform (1) is molded into the container (2), the container (2) is filled with drink (a) and the container is sealed with a lid (3); a heating furnace (50) that heats the preform (1) to a temperature suitable for molding the preform (1); a mold (4) that performs blow-molding of the preform (1) heated to the temperature suitable for molding the preform (1); a filler (39) that fills the blow-molded container (2) with the drink (a); a capper (40) that seals the container (2) filled with the drink (a), the heating furnace (50), the mold (4), the filler (39) and the capper (40) being arranged along the conveying path; and hydrogen peroxide supply means (43a) for blasting hydrogen peroxide mist (M) or gas to the preform (1) that is further disposed at a substantially middle portion of the preform conveying path in the heating furnace (50), wherein the preform (1) is preheated and is then subjected to blasting of the hydrogen peroxide mist (M) or gas at a first half conveying path in the heating furnace (50), and the preform (1) is then heated to the temperature suitable for the molding at a latter half conveying path.

Yet another embodiment comprises: a conveying path that continuously conveys a preform (1) or container (2) till the preform (1) is molded into the container (2), the container is filled with drink (a) and the container (2) is sealed with a lid (3); a heating furnace (50) that heats the preform (1) to a temperature suitable for molding the preform; a mold (4) that performs blow-molding of the preform (1) heated to the temperature suitable for molding the preform; a filler (39) that fills the blow-molded container (2) with the drink (a); a capper (40) that seals the container (2) filled with the drink (a), the heating furnace (50), the mold (4), the filler (39) and the capper (40) being arranged along the conveying path; preheating means (80) that preheats the preform (1) and is disposed to an upstream side of the conveying path than the heating furnace (50); and hydrogen peroxide supply means (81) for blasting hydrogen peroxide mist (M) or gas to the preheated preform (1).

A different embodiment 10 adopts a drink filling apparatus which comprises: a conveying path that continuously conveys a preform (1) or container (2) till the preform (1) is molded into the container (2), the container (2) is filled with drink (a) and the container (2) is sealed with a lid (3); a heating furnace (50) that heats the preform (1) to a temperature suitable for molding the preform; a mold (4) that performs blow-molding of the preform (1) heated to the temperature suitable for molding the preform; main sterilizing means (6, 46) that mainly sterilizes the blow-molded container (2); a filler (39) that fills the mainly sterilized container (2) with the drink (a); a capper (40) that seals the container (2) filled with the drink (a), the heating furnace (50), the mold (4), the main sterilizing means (4, 46), the filler (39) and the capper (40) being arranged along the conveying path; and hydrogen peroxide supply means (43a) for blasting hydrogen peroxide mist (M) or gas to the preform (1) that is further disposed at a substantially middle portion of the preform conveying path in the heating furnace (50), wherein the perform (1) is preheated to thereby preliminarily sterilize the preform (1) at a first half conveying path in the heating furnace (50), and the preform (1) is then heated to the temperature suitable for the molding at a latter half conveying path.

A further embodiment comprises: a conveying path that continuously conveys a preform (1) or container (2) till the preform (1) is molded into the container (2), the container (2) is filled with drink (a) and the container (2) is sealed with a lid (3); a heating furnace (50) that heats the preform (1) to a temperature suitable for molding the preform; a mold (4) that performs blow-molding of the preform (1) heated to the temperature suitable for molding the preform; main sterilizing means (6, 46) that mainly sterilizes the blow-molded container (2); a filler (39) that fills the blow-molded container with the drink (a); a capper (40) that seals the container (2) filled with the drink (a), the heating furnace (50), the mold (4), the main sterilizing means (6, 46), the filler (39) and the capper (40) being arranged along the conveying path; preheating means (80) that preheats the preform (1) to a temperature suitable for preliminary sterilization of the preform; and hydrogen peroxide supply means (81) for blasting hydrogen peroxide mist (M) or gas to the preheated preform (1) to thereby perform the preliminary sterilization.

Alternatively, it may be desired that the main sterilizing means includes a sterilizing nozzle (6) that blasts hydrogen peroxide condensed mist (M) or gas to the container (2) to which heat at the time of heating the preform (1) remains, and an air-rinsing nozzle (45) that performs air-rinsing to the container (1) to which the hydrogen peroxide condensed mist (M) or gas is blasted by blasting aseptic air (N).

As another possibility, it may be desired that the main sterilizing means includes a hot-water rinsing nozzle (46) for blasting hot water to the container (2), to which heat at the time of heating the preform remains, by blasting aseptic hot water (H).

Effects of the Invention

As disclosed, since the hydrogen peroxide mist (M) or gas is blasted to the preform (1) after the preheating in the state of the preform (1), even if the low density hydrogen peroxide is used, the sterilizing effect to the preform (1) can be improved. According such sterilization, the sterilizing ability against general bacteria, spore forming bacteria, fungus such as mold, yeast or like can be improved to the portions of the preform except the mouth portion (2a) thereof. In addition, since the sterilizing ability can be improved by the preheating, the hydrogen peroxide of extremely low density becomes usable. Furthermore, since the amount of the hydrogen peroxide adhering to the preform (1) can be reduced, defective molding such as whitening, spot generation, wrinkling formation, deformation and the like which will be likely caused at the time of blow molding for the container (2) can be surely prevented from causing.

Since the preliminary sterilization is performed by preheating the preform (1) to the temperature suitable for the preliminary sterilization, even if extremely low density hydrogen peroxide is used, the sterilizing effect to the preform (1) can be improved. In such preliminary sterilization, the sterilizing ability against general bacteria, spore forming bacteria, fungus such as mold, yeast or like can be improved to the portions of the preform except the mouth portion (2a) thereof. In addition, since the sterilizing ability can be improved by the preheating, the hydrogen peroxide of extremely low density becomes usable. Furthermore, since the amount of the hydrogen peroxide adhering to the preform (1) can be reduced, defective molding such as whitening, spot generation, wrinkling formation, deformation and the like which will be likely caused at the time of blow molding for the container (2) can be surely prevented from causing.

Furthermore, after the above-mentioned preliminary sterilization to the preform (1), the preform is subsequently molded into the container (2), and the container (2) is then subjected to the main sterilization in the hot state of the container (2), so that the load to the main sterilization can be reduced. That is, when the main sterilization is performed by using the sterilizing agent such as hydrogen peroxide, acetyl hydroperoxide, chlorine water, ozone or like, the using amount of such sterilizing agent, and temperature and density of medical agent to be used can be reduced, and in the case when the sterilization is performed by using hot water, the using amount thereof can be reduced with low temperature, and in the case when a UV lamp is used, the irradiation amount can be reduced. In addition, since the using amount of the hydrogen peroxide in the main sterilization process can be reduced, the excessive adsorption of the hydrogen peroxide to the container (2), in which the preform (1) and the container (2) are formed of PET, can be prevented.

Moreover, in the case when the above-mentioned main sterilization is performed by blasting the hydrogen peroxide condensed mist (M) or gas (G) to the container (2) to which heat generated by heating the preform (1) remains, and the air-rinsing process is subsequently performed by using aseptic air (N), the forming of spore can be sterilized, so that low acidic drink having pH higher than pH 4.6P or more can fill the container (2). Furthermore, in the case when the main sterilization is performed by the hot-water rinsing process using aseptic hot water (H), since the preliminary sterilization is performed by the extremely low density hydrogen peroxide, such a problem as that the hydrogen peroxide remains on the container (2) can be solved, and the main sterilization is applicable for the filling of drink such as mineral water or like other than low acidic drink.

BRIEF DESCRIPTION OF THE DRAWINGS

FIG. 9 shows a modified example of a preheater in the second embodiment of the present invention, in which (A) is a plan view thereof and (B) is a side view thereof.

EMBODIMENT FOR CARRYING OUT THE INVENTION

Hereunder, embodiments for carrying out the present invention will be explained.

First Embodiment

Figure 2:
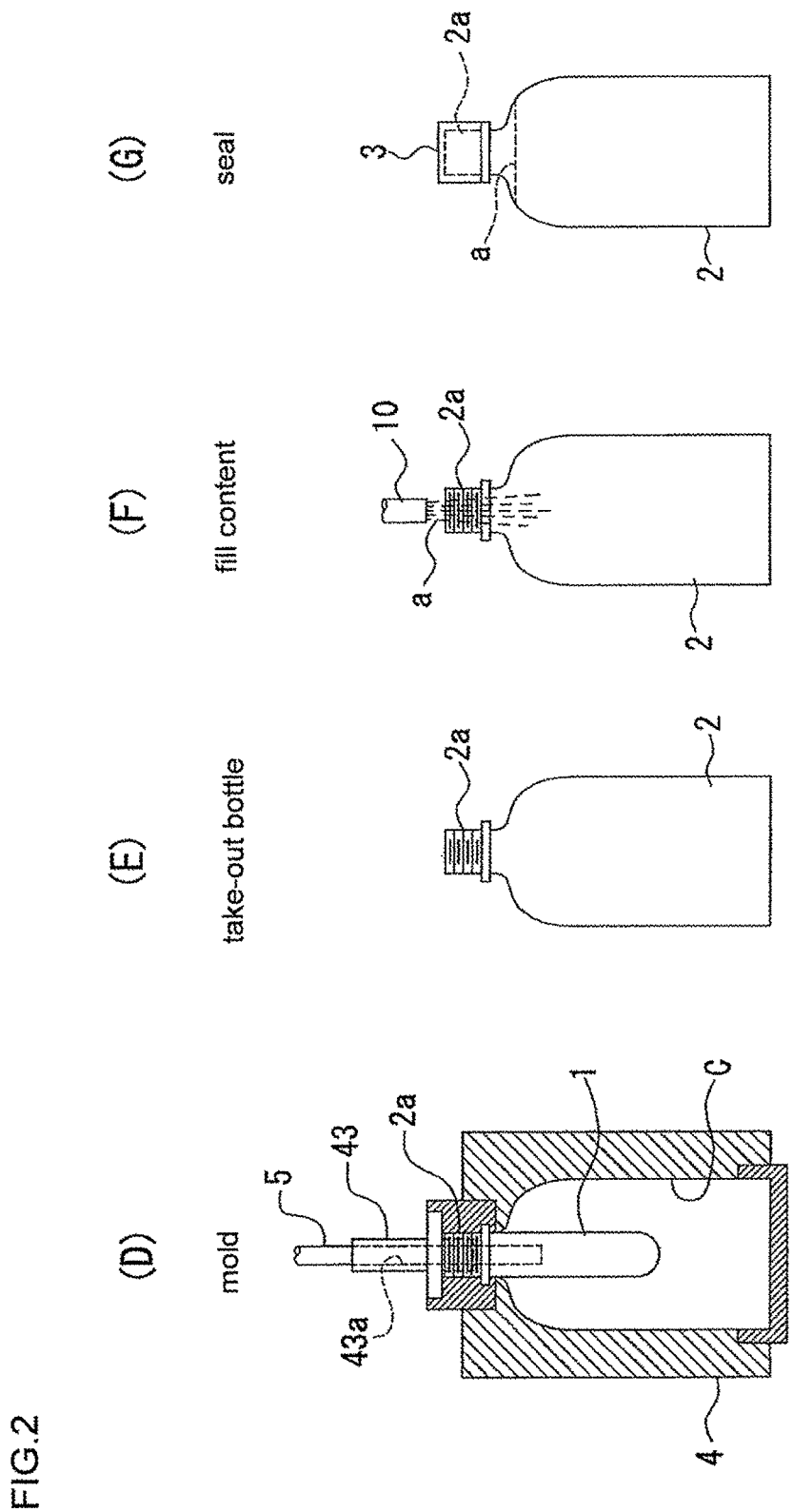
FIG. 2 is an illustration for explaining respective steps D, E, F, G of the filling method according to the first embodiment of the present invention.

According to an inline system of this first embodiment, a package shown in FIG. 2(G) can be manufactured as a final product.

The package is composed of a bottle 2 as a container and a cap 3 as a lid.

In this embodiment, although the bottle 2 is made of polyethylene-terephthalate (PET), another resin such as polypropylene, polyethylene or like may be used for manufacturing the package without limiting to the PET, and a male screw (threaded) portion is formed to a mouth portion 2a of the bottle 2.

The cap 3 is produced by an injection molding process with by using polypropylene as a resin material, and a female screw (threaded) portion is also formed together with the molding of the cap 3.

The bottle 2, with the interior thereof being preliminarily sterilized, is filled up with drink "a" which had already been sterilized, and after the filling of the drink "a", the cap 3 is applied to the mouth portion 2a of the bottle 2, which is then sealed through the screw-engagement between the male and female screws 2b and 3a, thus completing the package.

The bottle 2 mentioned above is formed in accordance with processes, which will be described hereinafter, as a container, and the container is then filled up with the drink and sealed as the package.

First, the preforms 1 are continuously delivered at a predetermined speed.

The preform 1 is formed as a bottomed cylindrical body having substantially test tube shape through the PET injection molding process. The preform 1 is formed with a mouth portion 2a like that of the bottle shown in FIG. 2(G) at a time of initial molding process. This mouth portion 2a is formed with the male screw at the same time of molding the preform 1.

Figure 1:
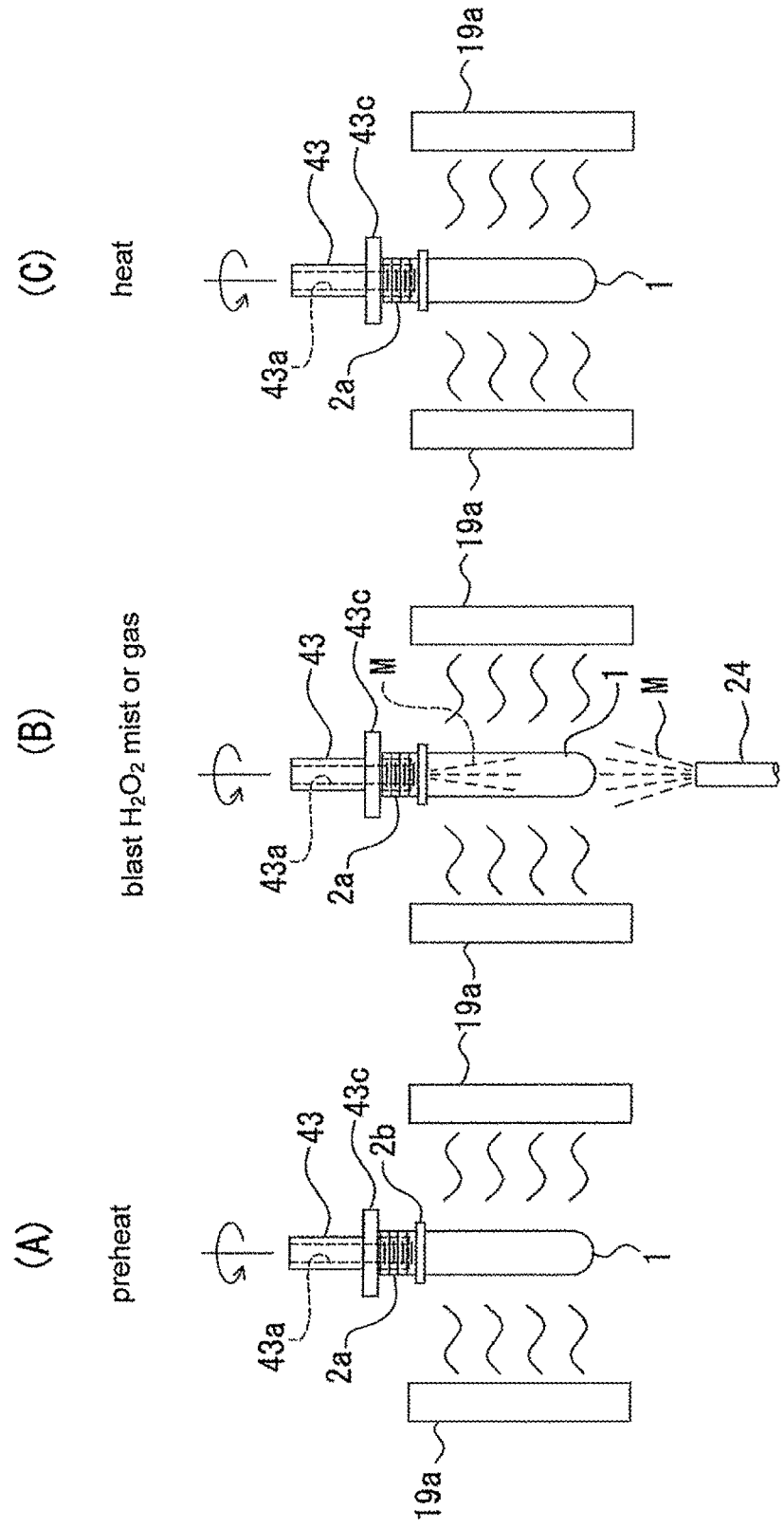
FIG. 1 is an illustration for explaining respective steps A, B, C of a filling method according to a first embodiment of the present invention.

Just after the starting of the conveyance or delivery of the preform 1, the preform 1 is preheated as shown in FIG. 1(A). More specifically, the preform 1 is preheated by being delivered into a heating furnace 50 shown in FIG. 3.

The heating furnace 50 has a furnace room extending in one direction. Inside the furnace room, an endless chain 19 is stretched between a pair of pulleys 51*a* and 51*b* arranged oppositely in a horizontal plane. The endless chain 19 constitutes an endless conveyer, together with associated members, that conveys a number of preforms 1 in a suspended state. Infrared heaters 19*a* are attached to an inner wall surface of the furnace room along outward path and return path.

When the preform 1 is conveyed into the heating furnace 50, the preform 1 is heated by the infrared heaters 19*a* while being conveyed along the outward path of the endless chain 19, and during this conveyance, the preform 1 is heated to about 40 to 80° C.

However, the heating temperature to the mouth portion 2*a* of the preform 1 is suppressed at a temperature equal to or less than 50° C. at which the preform is not deformed so as not to damage sealing performance when the cap 3 is applied.

The preform 1 is travelled while rotating together with a spindle (or mandrel) in a state of being suspended in an erected (or inverted) state by inserting the spindle (or mandrel) 43 into the mouth portion 2*a* of the preform 1 as shown in FIG. 1(A). According to the travelling in such state, the preform 1 can be evenly preheated by the infrared heaters 19*a*.

Further, the preform 1 may be travelled while rotating together with the mandrel in the inverted state by inserting the mandrel, instead of the spindle 43, into the mouth portion 2*a*.

Next, as shown in FIG. 1(B), the hydrogen peroxide mist M or gas is supplied into the preform 1 now travelling to thereby perform preliminary sterilization. The supplying of the hydrogen peroxide mist M or gas is performed at the point when the preheating to the preform 1 has been completed. For example, such supply of the hydrogen peroxide mist will be performed at the time when the endless chain 19 is turned from the outward travelling to the return travelling.

More specifically, a through hole 43*a* is formed to a shaft core of the spindle 43, and the supplying of the hydrogen peroxide mist M or gas is performed by a nozzle which is formed from such spindle 43 through which the hydrogen peroxide mist M or gas is blasted into the preform 1.

Herein, the hydrogen peroxide mist M or gas blasted into the preform 1 is generated by a mist generator 7, which will be explained hereinafter. It is preferred that the hydrogen peroxide mist M or gas flowing into the preform 1 from the spindle 43 contacts the inner surface of the preform 1 to thereby form a condensed film of the hydrogen peroxide of reduced 35 weight %, and preferably adhere in a range of 0.001 $\mu L/cm^2$ to 0.05 $\mu L/cm^2$.

In a case of the adhering amount of less than 0.001 $\mu L/cm^2$, sufficient sterilization effect could not be expected, and on the other hand, in a case of the adhering amount of more than 0.05 $\mu L/cm^2$, defective phenomenon at a molding process such as generation of whitening, spot generation, wrinkling formation, deformation and the like will be liable to be caused at the time of blow molding as shown in FIG. 2(D).

The adhering amount of the hydrogen peroxide condensed film of the reduced 35 weight % to the preform 1 is more preferably of 0.002 $\mu L/cm^2$ to 0.03 $\mu L/cm^2$.

As mentioned above, since the condensed film of the hydrogen peroxide is adhered to the preform 1, the hydrogen peroxide becomes active on the surface of the preform 1, which leads to the improved sterilization effect to the surface of the preform 1. In addition, according to such improvement of the sterilization effect, the amount of the hydrogen peroxide to be used for the sterilization can be reduced, and hence, the possibility of remaining of the hydrogen peroxide on the surface of the preform 1 or bottle 2 will be also reduced.

Further, as shown in FIG. 1(B), it may be possible to arrange the nozzle 24 below the preform 1 and blast the hydrogen peroxide mist M or gas similar to the hydrogen peroxide mist M or gas supplied to the inner surface of the preform 1 toward the outer surface of the preform 1 from the nozzle 24.

As shown in FIG. 1(C), the preform 1 on the surface of which the condensed film of the hydrogen peroxide adheres is moved toward the return path of the endless chain 19, and during the travelling on the return path, the preform 1 is further heated uniformly to a temperature suitable for the blow molding at the time when the preform 1 goes out of the heating furnace 50, and the temperature is about 90 to 130° C.

Further, a temperature for heating the mouth portion 2*a* of the preform 1 is suppressed to a temperature less than 50° C. for preventing deformation of the preform because of the reason as mentioned hereinbefore.

The preform 1 heated to the temperature suitable for the blow molding is molded to the bottle 2 as a container to be blow-molded as shown in FIG. 2(D).

The mold 4 as a molding die for the blow molding is continuously moved at the same speed as the travelling speed of the preform 1 to take a position for mold clamping process, and after the blow molding process to the preform 1 in the mold 4, the mold is opened.

The preform 1 has been uniformly heated during the heating process shown in FIGS. 1(A) to (C) to the temperature suitable for molding the whole portion, except the mouth portion 2*a*, of the preform 1, and while maintaining such heated temperature, the preform 1 is mounted into the mold 4 together with the spindle 43 as shown in FIG. 2(D). The blow nozzle 5 is inserted into the preform 1 through the through hole 43*a* formed to the spindle 43.

During the travelling of the mold 4, air for primary blow molding or secondary blow molding, for example, is continuously blasted into the preform 1 through the blow nozzle 5, and the preform 1 is thereby swelled to the bottle 2 as a final product in the cavity C of the mold 4.

After the bottle 2 has been molded in the mold 4 as mentioned above, the mold 4 is then opened while being continuously travelled, and then, the bottle 2 as final product is taken out of the mold 4 as shown in FIG. 2(E).

Figure 5:
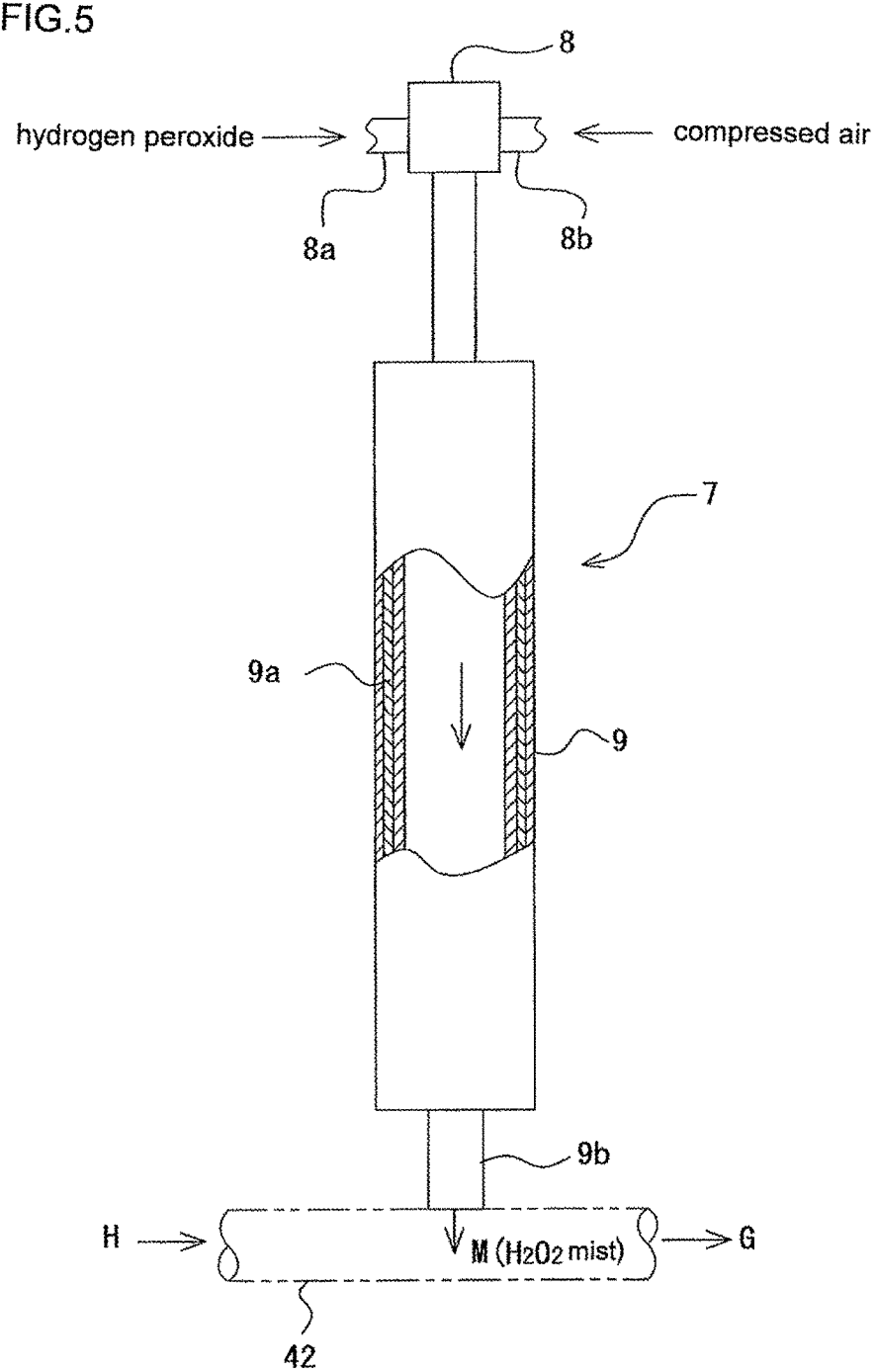
FIG. 5 is a vertical sectional view showing one example of a mist generator for generating hydrogen peroxide mist or gas.
Figure 6:
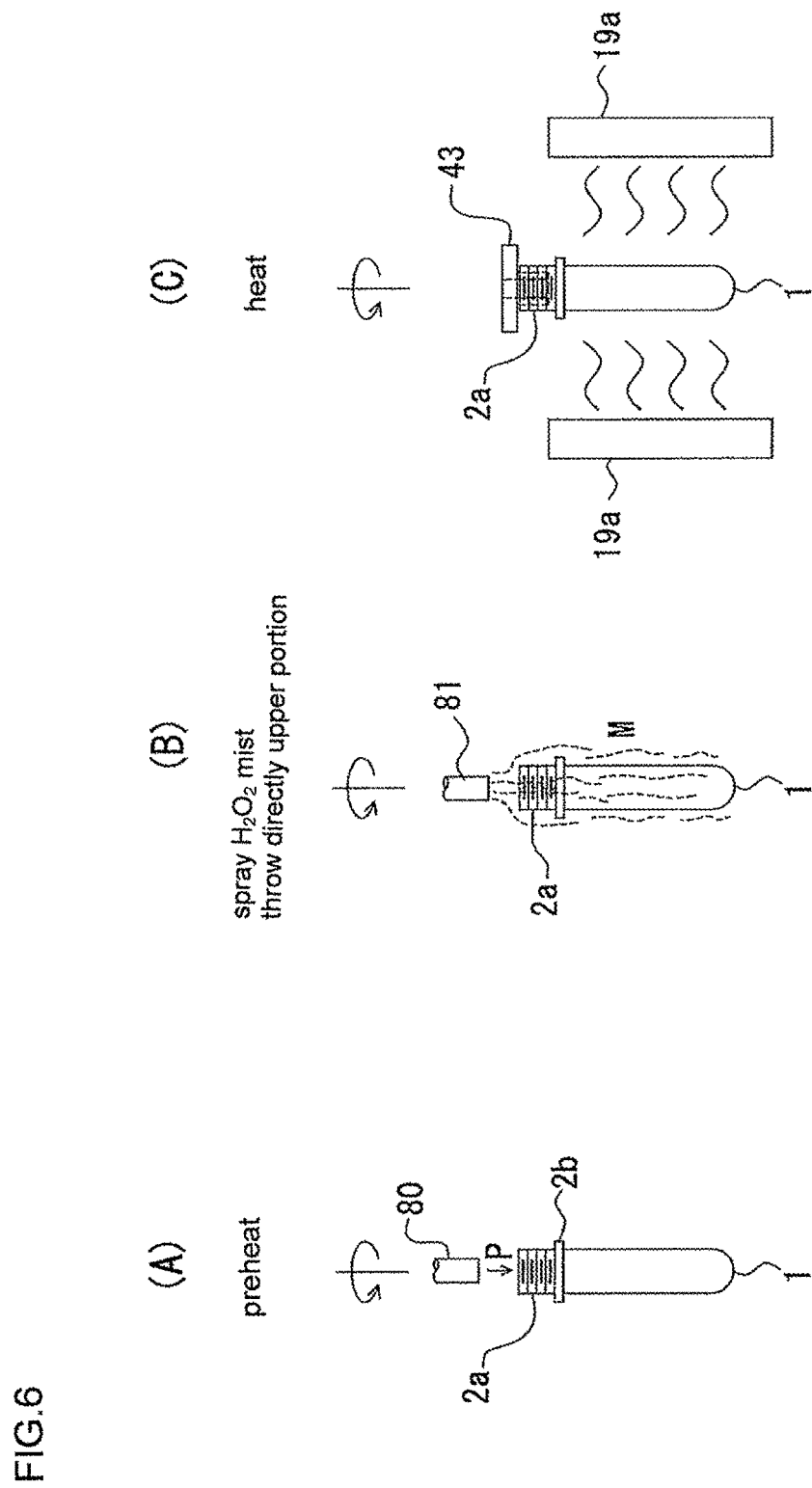
FIG. 6 is an illustration for explaining respective steps A, B, C of a filling method according to a second embodiment of the present invention.
Figure 7:
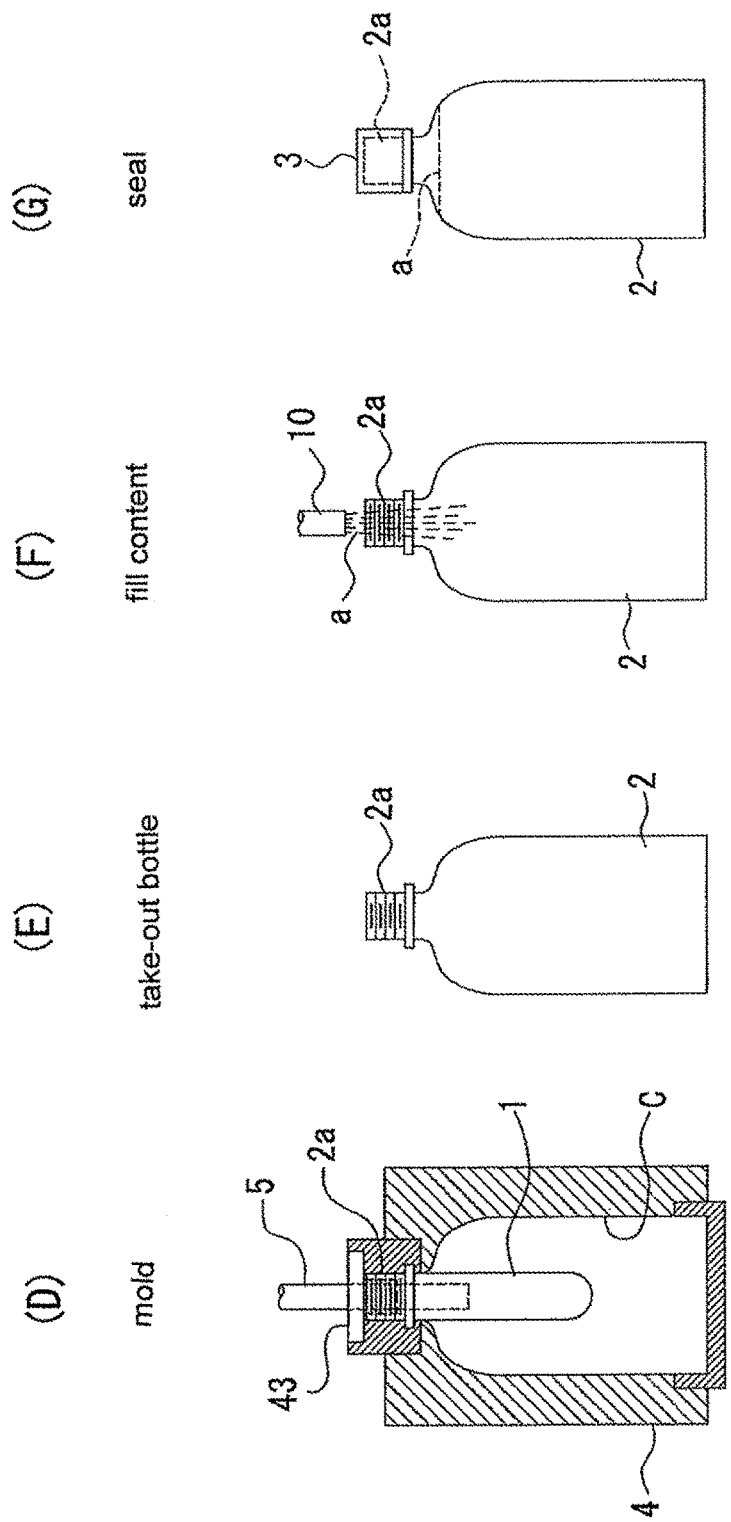
FIG. 7 is an illustration for explaining respective steps D, E, F, G of the filling method according to the second embodiment of the present invention.

The hydrogen peroxide mist M or gas may be generated by, for example, the mist generator 7 shown in FIG. 5.

The mist generator 7 is provided with a hydrogen peroxide supply portion 8 as a two-fluid spray for supplying solution of the hydrogen peroxide as the sterilizing agent in form of drops and a carburetor portion 9 heating and vaporizing the sprayed hydrogen peroxide supplied form the hydrogen peroxide supply portion 8 to a temperature more than boiling point and less than undegradable temperature. The hydrogen peroxide supply portion 8 acts to take hydrogen peroxide solution and compressed air respectively from a hydrogen peroxide supply passage 8*a* and a compressed air supply passage 8*b* so as to atomize the hydrogen peroxide solution into the carburetor portion 9. The carburetor portion 9 is a pipe composed of inner and outer wall sections between which a heater 9*a* is interposed, and the heater 9*a* heats the atomized hydrogen peroxide solution blasted into the pipe to thereby evaporate the same. The evaporated hydrogen peroxide gas is exhausted as condensed mist M outside the carburetor portion 9 through an exhaust nozzle 9.

The mist M shown in FIG. 1(B) is this condensed mist. In a case when gas G is utilized in place of this mist M, a conduit 42 through which heated wind H flows may be connected to the front end of a discharge nozzle 9b as shown in FIG. 5, and the condensed mist M discharged from the discharge nozzle 9b is gasified by the heated wind H into the gas G, which then flows to the through hole 43a formed in the shaft core of the spindle 43.

After the bottle 2 is molded, as shown in FIG. 2(F), the bottle 2 is filled up with the drink "a" from the filling nozzle 10, and as shown in FIG. 2(G), the bottle 2 is then sealed with the cap 3 as the lid.

In the manner mentioned above, the bottles 2 formed as packages are collected and transported to market.

Figure 3:
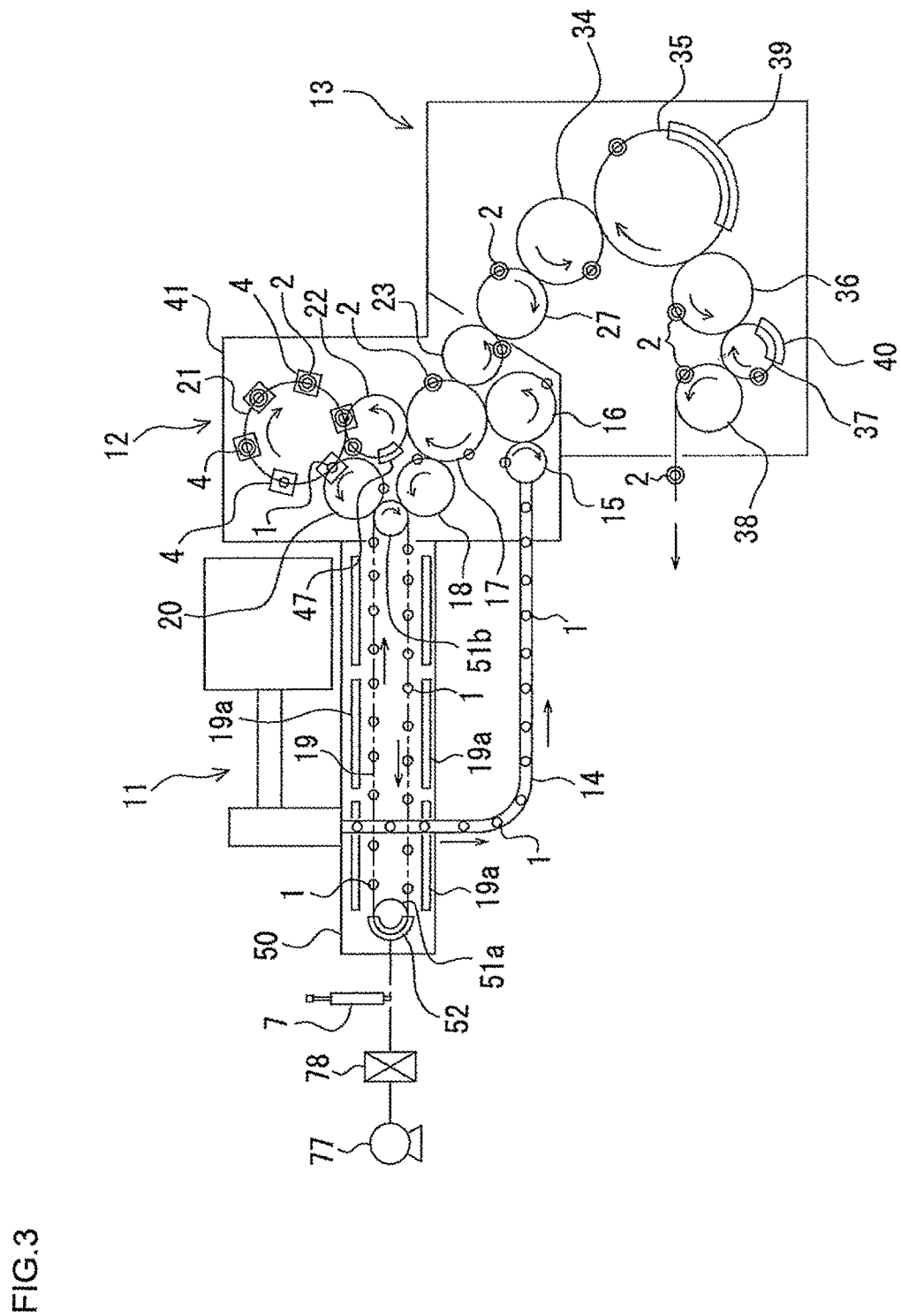
FIG. 3 is a plan view showing a schematic arrangement of one example of a filling apparatus according to the first embodiment.

A filling apparatus for carrying out the filling method mentioned above has a configuration or structure as shown in FIG. 3, for example.

As shown in FIG. 3, this filling apparatus is provided with a preform supply machine 11 for supplying the bottomed tubular preform 1 having the mouth portion 2a (see FIG. 1(A)) sequentially at predetermined interval, a blow molding machine 12, and a filling machine 13 for filling the molded bottle 2 with the drink "a" and then sealing the bottle 2.

On the pathway between the preform supply machine 11 to the filling machine 13, there are arranged a preform conveying means for conveying the preforms on the first conveying path, a mold conveying means for conveying the molds 4 (see FIG. 2(D)) each having a cavity having a shape corresponding to a completed bottle 2 on a second conveying path connected to the first conveying path, and a bottle conveying means for conveying the bottles 2 molded by the molds 4 on a third conveying path connected to the second conveying path.

The first conveying path of the preform conveying means, the second conveying path of the mold conveying means, and the third conveying path for the bottle conveying means are communicated with each other, and grippers or like members, not shown, for conveying the preforms 1 and the bottles 2 in the state of being held are arranged on and along these conveying paths.

The preform conveying means is provided, on the first conveying path, with a preform conveyer 14 for sequentially conveying the preforms 1 at predetermined interval. The preform conveying means is also provided with a wheel train including wheels 15, 16, 17 and 18 for receiving and conveying the preforms 1 from the terminal end of the preform conveyer 14 and an endless chain 19 receiving the preforms 1 from the wheel 18 and then travelling the preforms.

The endless chain 19 is arranged, as preform conveying path, within a heating furnace, as described hereinbefore. A number of spindles 43, shown in FIG. 1(A), are mounted at predetermined constant pitch. The respective spindles 43 can be rotated while being travelled together with the travelling of the endless chain 19. As shown in FIG. 1(A), the spindle 43 is inserted into the mouth portion 2a of the preform 1 conveyed to the endless chain 19 from the wheel 18, and in this state, the preform 1 is maintained in the upright attitude by the spindle 43.

After the preform 1 has been received by the spindle 43 through the preform conveyer 14 and the train of the wheels 15, 16, 17 and 18, the preform 1 is travelled while rotating along the inner wall surface of the heating furnace 50. The infrared heater 19a is widely arranged on the inner wall surface of the heating furnace 50 so as to heat the preform 1 conveyed by the spindle 43. The preform 1 is rotated according to the rotation of the spindle 43 during the travelling in the heating furnace 50, and uniformly heated by the infrared heater 19a. Furthermore, the preform 1 is preheated (FIG. 1(A)) within the heating furnace 50 during the traveling on the outward path of the endless chain 19.

As shown in FIG. 1(B), hydrogen peroxide supply means for blasting the hydrogen peroxide mist M or gas to the preform 1 is provided, at a position in the vicinity of one pulley 51a, i.e., approximately middle portion of the preform conveying path by the endless chain 19.

Figure 4:
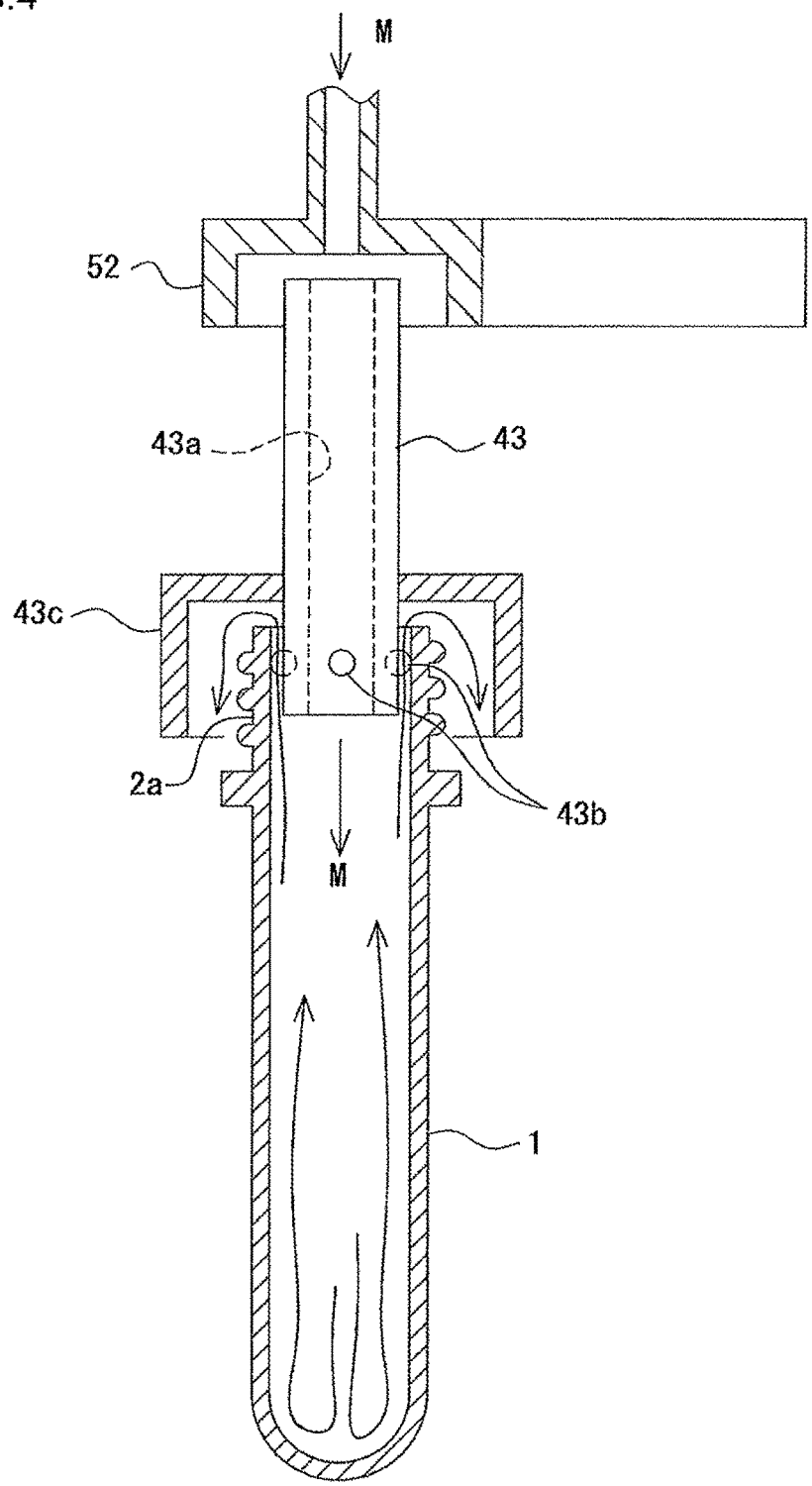
FIG. 4 is a vertical sectional view showing an apparatus for supplying hydrogen peroxide mist or gas into a preform.

As shown in FIGS. 3 and 4, such hydrogen peroxide supply means as mentioned above is provided with a groove member 52 that extends so as to cover an upper end of the spindle 43 along the travelling path of the spindle 43 in the state of holding the preform 1. As shown in FIG. 3, a blower 77 and a filter 78 are connected to the groove member 52 through a conduit, and a mist generator 7 shown in FIG. 5 is connected to a portion of the conduit between the filter 78 and the groove member 52.

The hydrogen peroxide mist M or gas generated by the mist generator 7 is fed from the blower 77, enters the groove member 52 together with flow-gas sterilized by the filter 78, and then flows into the preform 1 through the through hole 43a formed to the spindle 43. As shown in FIG. 4, a plurality of ball-shaped elastic materials 43b made of rubber or like are embedded in a lower portion of the spindle, and the preform 1 is supported to the spindle 43 by elastic deformation of such elastic materials 43b. The hydrogen peroxide mist M or gas entering the preform 1 flows out of the preform 1 through a clearance formed by the elastic materials 43b between the inner peripheral surface of the mouth portion 2a of the preform 1 and the outer peripheral surface of the spindle 43.

According to the operation mentioned above, the condensed film of the hydrogen peroxide adheres to the inner surface of the preform 1 to thereby sterilize the inner surface of the preform 1. The adhering amount of the hydrogen peroxide as the film of a converted amount of 35 weight % is preferably of 0.01 μL/cm² to 0.05 μL/cm², and more preferably, 0.02 μL/cm² to 0.03 μL/cm², and with such amount, the concentration of the hydrogen peroxide adhering to the surface of bacteria is increased by the heat due to preheating to the preform 1, thereby sterilizing almost all bacteria adhering to the surface of the preform 1, except the mouth portion 2a.

Further, as shown in FIG. 4, a guide member 43c for guiding the hydrogen peroxide mist M or gas flowing out of the preform 1 through the clearance mentioned above so as to flow along the male thread portion of the mouth portion 2a of the preform 1 is attached to the spindle 43 in a shape like an umbrella. According to such guidance by the guide member 43c, the hydrogen peroxide mist M or gas easily contacts the male thread portion of the mouth portion 2a of the preform 1, and as a result, the outer surface of the preform 1 can also be sterilized properly.

The preform 1 is further heated by the infrared heater 19a in the return path of the endless chain 19 till the time when the preform 1 except the mouth portion 2a is heated to an increased temperature of 90° C. to 130° C., which is a temperature suitable for the blow molding process.

The blow molding machine 12 is provided with plural sets of the mold and blow nozzle (FIG. 2(D)) for receiving the preform 1 heated by the infrared heater 19a of the preform supply machine 11 and molding the preform 1 into the bottle 2.

The second conveying path of the mold conveying means mentioned hereinbefore is arranged within the blow molding machine 12. This second conveying path is composed of a row of the wheels 20, 21, 22, 17 and 23. Further, the wheel 17 in the row of the above wheels 20, 21, 22, 17, 23 and the row of the wheels 15, 16, 17, 18 of the preform conveying means is commonly used.

A plurality of such molds 4 and blow nozzles 5 are arranged around the wheel 21 so as to swivel at a constant speed around the wheel together in association with the rotation of the wheel 21.

When a gripper, not shown, of the wheel 20 receives the preform 1, together with the spindle 43, which was heated in the heating furnace 50 of the preform supply machine 11, and transfers the preform 1 to the mold 4 disposed around the wheel 21, the halved mold (mold halves) 4 is closed to thereby hold the preform 1 as shown in FIG. 2(D).

The preform 1 in the mold 4 is blown with highly pressurized air for the blow-molding process while swiveling around the wheel 21 together with the mold 4 and the blow nozzle 5, and then, molded to the bottle 2 as final product. In such process, since the preform 1 is evenly heated to a predetermined temperature within the heating furnace 50, the blow-molding can be smoothly performed.

Furthermore, as described hereinbefore, the adhering amount of the hydrogen peroxide as the film of a converted amount of 35 weight % is preferably of 0.01 $\mu L/cm^2$ to 0.05 $\mu L/cm^2$, and more preferably, 0.02 $\mu L/cm^2$ to 0.03 $\mu L/cm^2$, and accordingly, the condensed hydrogen peroxide film is evaporated from the surface of the preform 1 during the travelling on the return path of the endless chine 19, thereby properly performing the blow-molding process without generating whitening, spot, deformation and the like to the bottle 2.

When the preform 1 is tightly contacted to the mold 4 and then the bottle 2 is formed in the cavity C of the mold 4, the mold 4 is opened at the time of contacting the wheel 22 to thereby release the bottle 2 and the spindle 43. Then, the bottle 2 is transferred to the gripper, not shown, of the wheel 22 from the spindle 43.

On the other hand, the spindle 43 from which the bottle 2 is released is returned to the endless chain 19 for subsequently receiving and holding another preform 1 to convey the same.

The bottle 2 released from the blow molding machine 12 to the wheel 22 is inspected by an inspection device 47 located to the outer peripheral portion of the wheel 22 to inspect the bottle 2 to be defective or not in molded state.

The inspection device 47 is provided, though not shown, with bottle body inspecting means for discriminating "right and wrong" of the body portion of the bottle 2, support ring inspecting means for discriminating "right and wrong" of the support ring 2b (see FIG. 1(A)) of the bottle 2, bottle neck portion top surface inspecting means for inspecting "right and wrong" of the top surface of the neck portion of the bottle, bottle bottom portion inspecting means for inspecting "right and wrong" of the bottle bottom portion, and temperature inspecting means for inspecting the temperature of the bottle 2 to thereby finally discriminate "right and wrong" of the bottle 2.

The bottle body inspecting means, the support ring inspecting means, the bottle neck portion top surface inspecting means, and the temperature inspecting means for inspecting the temperature of the bottle 2 are arranged along the outer periphery of the wheel 22.

The bottle body inspecting means, the support ring inspecting means, and the bottle neck portion top surface inspecting means photograph the bottle 2 respectively at predetermined portions with lamps and cameras, though not shown, and the photographed images are treated by an image processing device to thereby discriminate generation of abnormality in shape, injury, foreign material, change of color, and the like.

The temperature inspecting means includes a temperature sensor, not shown, for detecting the surface temperature of the bottle 2, and in a case when the detected temperature is lower than the predetermined temperature, the bottle 2 is discriminated as defective product. That is, the bottle 2 heated to a temperature less than the predetermined temperature may be deemed as not being sufficiently sterilized even if sterilized with the hydrogen peroxide in the subsequent post-treatment. On the contrary, in a case when the detected temperature reaches the predetermined temperature, the bottle 2 will be sufficiently sterilized by the hydrogen peroxide in the post-treatment.

Further, the inspection device 47 may be provided as occasion demands, and in addition, the bottle body inspecting means, the support ring inspecting means, the bottle neck portion top surface inspecting means and the temperature inspection means may be selectively provided.

When the inspected bottle 2 is discriminated as defective product, such bottle 2 is rejected from the conveying path by a rejecting device, not shown, and only the acceptable bottle 2 is conveyed and transferred from the wheel 22 to the wheel 23 through the wheel 17.

The filling machine 13 is provided therein with the third conveying path of the bottle conveying means. The third conveying path is provided with a row of wheels 27, 34, 35, 36, 37 and 38.

An air rinsing nozzle is disposed on the outer periphery of the wheel 27 as occasion demands. By blowing aseptic air from this air rinsing nozzle into the bottle 2, foreign material, remaining hydrogen peroxide or like is rejected from the interior of the bottle 2.

Furthermore, a filler 39 for filling the bottle 2 in aseptic state with the drink "a" is provided around the outer periphery of the wheel 35, and a capper 40 for applying the cap 3 (see FIG. 2(G)) to the bottle 2 filled up with the drink "a" and then sealing the bottle 2 is also provided around the wheel 37.

Further, the filler 39 and the capper 40 are known ones, and accordingly, the explanations thereof are omitted herein.

Furthermore, the filling apparatus is surrounded by a wall of the chamber 41, having an interior which is sectioned into an aseptic zone and gray zone, and the preform supplying machine 11 and the blow molding machine 12 are installed inside the gray zone, and the filling machine 13 is installed inside the aseptic zone, respectively.

Aseptic air sterilized by HEPA is always blasted into the gray zone to thereby the bottle 2 sterilized during the molding process is transferred into the aseptic zone without being secondarily contaminated by bacteria.

Hereunder, the operation of the filling apparatus will be described with reference to FIGS. 1 to 5.

First, the preform 1 is conveyed to the heating furnace 50 by means of the line of the preform conveyer 14 and the respective wheels 15, 16, 17 and 18.

When the preform 1 then enters into the heating furnace 50, the preform is preheated during the passing on the outward path of the endless chain 19.

The thus preheated preform 1 is blasted with the hydrogen peroxide mist M or gas at the terminal end of the outward path of the endless chain 19, as shown in FIG. 1(B) and FIG. 4. According to such blasting of the hydrogen peroxide, a thin condensed film of the hydrogen peroxide is formed on the inner surface of the preform 1. Since the preform 1 is preheated to the temperature for preliminary sterilization, the hydrogen peroxide adhering to the preform 1 is activated to thereby enhance the sterilizing effect.

The preform 1 is further heated within the heating furnace 50, and the entity, except the mouth portion 2a, of the preform 1 is evenly heated to the temperature range suitable for the blow molding.

The preform 1, which has preheated, sterilized and heated to the temperature suitable for the molding process, is held by the mold 4 as shown in FIG. 2(D) during the passing around the outer periphery of the wheel 21 and swelled by blowing highly pressurized air from the blowing nozzle 5 within the cavity C of the mold 4 as a final product of the bottle 2.

The thus molded bottle 2 is taken out of the mold 4 by the gripper of the wheel 22 after the opening of the mold 4, and then inspected by the inspection apparatus 47 to determine whether the bottle 2 is defective or not in the molded state or like.

Thereafter, the bottle 2 travels within the filling machine 13 while being transferred through the row of the wheels 17, 23, 27, 34, 35, 36, 37 and 38.

The bottle 2 in the filling machine 13 is filled up with the sterilized drink "a" from the filling nozzle 10 of the filler 39 as shown in FIG. 2(F). The bottle 2 filled up with the drink "a" is capped and sealed with the cap 3 by the capper 40 (see FIG. 2(G)) and is then discharged through the outlet of the chamber 41.

As described hereinbefore, since the filler 39 and the capper 40 are known ones, the explanation of a method of filling the bottle 2 with the drink "a" and sealing the bottle 2 is omitted herein.

Embodiment 2

An embodiment 2 will be explained hereunder with reference to FIGS. 6 to 9.

Although, in the embodiment 1, the preheating of the preform 1 (see FIG. 1(A)) is performed within the heating furnace 50, the preheating of the preform 1 shown in FIG. 6(A) and the sterilization of the preform 1 shown in FIG. 6(B) are performed just before the introduction into the heating furnace 50.

That is, as shown in FIG. 6(A), the preform 1 is preheated at a position outside the heating furnace 50 by supplying hot air P from a nozzle 80 to a temperature suitable for sterilization of the preform 1.

A plurality of such nozzles 80 for blasting the hot air P may be arranged. That is, it may be possible, as shown in FIGS. 9(A) and (B), to dispose a manifold 82 so as to extend along the circular-arc shape of the wheel 17 and mount a number of nozzles 80 to the lower surface of the manifold so as to extend along the circular-arc shape of the wheel 17. The hot air P supplied inside the manifold 82 is blasted out of the respective nozzles 80. The row of the preforms 1 travel below the row of these nozzles 80 with the mouth portions 2a being directed upward. According to such operation, the hot air P discharged from the respective nozzles 80 is blasted into the respective preforms 1 through the mouth portions 2a thereof, thus preheating the inner surfaces of the preforms 1.

As shown in FIG. 6(B), the preheated preform 1 is sterilized by blasting the hydrogen peroxide mist M or gas from a nozzle 81. According to such blasting of the hydrogen peroxide, bacteria or like adhering to the surface of the preform 1 is almost sterilized except the inner surface of the mouth portion 2a.

The preform to which the hydrogen peroxide mist M or gas adheres is then heated, as shown in FIG. 6(C), within the heating furnace 50 to the temperature suitable for the molding process. The preform 1 is then blow-molded into a bottle 2 within the mold 4 as shown in FIG. 7(D), and as shown in FIG. 7(E), such bottle 2 is taken out of the mold 4.

The bottle 2 taken out of the mold 4 is filled up with the drink "a" as shown in FIG. 7(F), and then, is applied with the cap 3 as shown in FIG. 7(G) to seal the bottle 2.

The filling method of the present embodiment 2 is particularly suitable for producing drinks, which is not required to sterilize spore forming bacteria, such as acidic drink other than low-acidic drink, carbonated drink, mineral water, or like.

Figure 8:
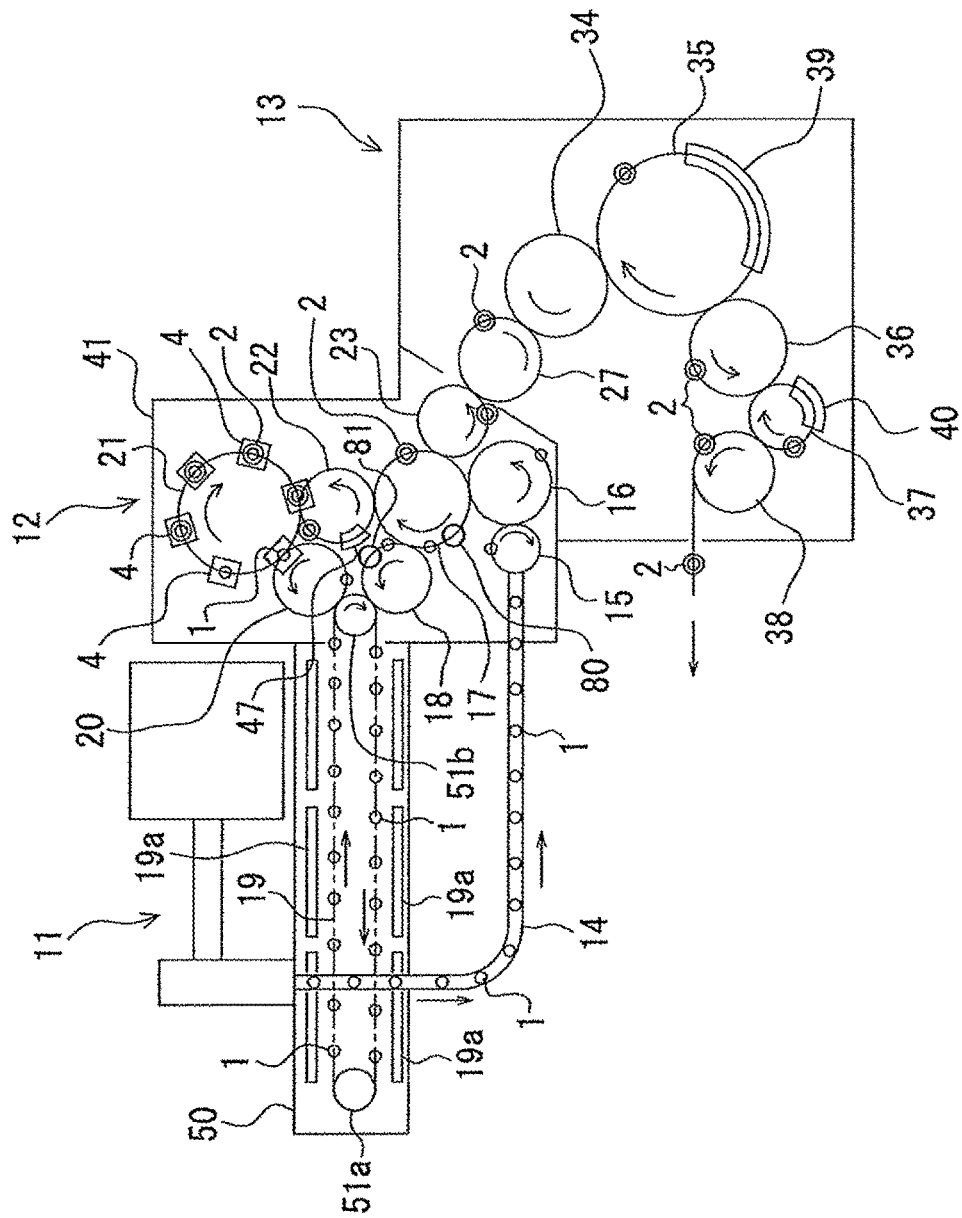
FIG. 8 is a plan view showing a schematic arrangement of one example of a filling apparatus according to the second embodiment.

As shown in FIG. 8, the filling apparatus for performing the filling method of this second embodiment 2 is provided with a nozzle 80 for discharging the hot air P as means for preheating the preform 1 at a portion in the vicinity of the wheel 17 arranged outside the heating furnace. As shown in FIG. 6(A), the hot air discharged from the nozzle 80 is blasted toward the interior of the preform 1 through the mouth portion 2a thereof to thereby preheat the inner surface of the preform 1.

Further, a nozzle 81 for discharging the hydrogen peroxide mist M or gas is arranged, as means for sterilizing the preform 1, in the vicinity of the wheel 18 disposed outside the heating furnace 50.

As shown in FIG. 6(B), a part of the hydrogen peroxide mist M or gas discharged from the nozzle 81 flows into the preform 1 through the mouth portion 2a thereof and the other part of the hydrogen peroxide mist M or gas flows down along and in contact with the outer surface of the preform 1, thereby sterilizing both the inner and outer surface of the preform.

Structure or arrangement of devices and/or members used after such sterilizing treatment to the preform 1 to the filling treatment of the drink "a" in the bottle 2 are substantially the same as those of the embodiment 1 mentioned hereinbefore, and accordingly, the explanation thereof will be omitted herein.

Furthermore, in the present embodiment 2, the same portions or parts as those of the first embodiment 1 are added with the same reference numerals and the explanation thereof will be omitted herein.

Embodiment 3

Figure 11:
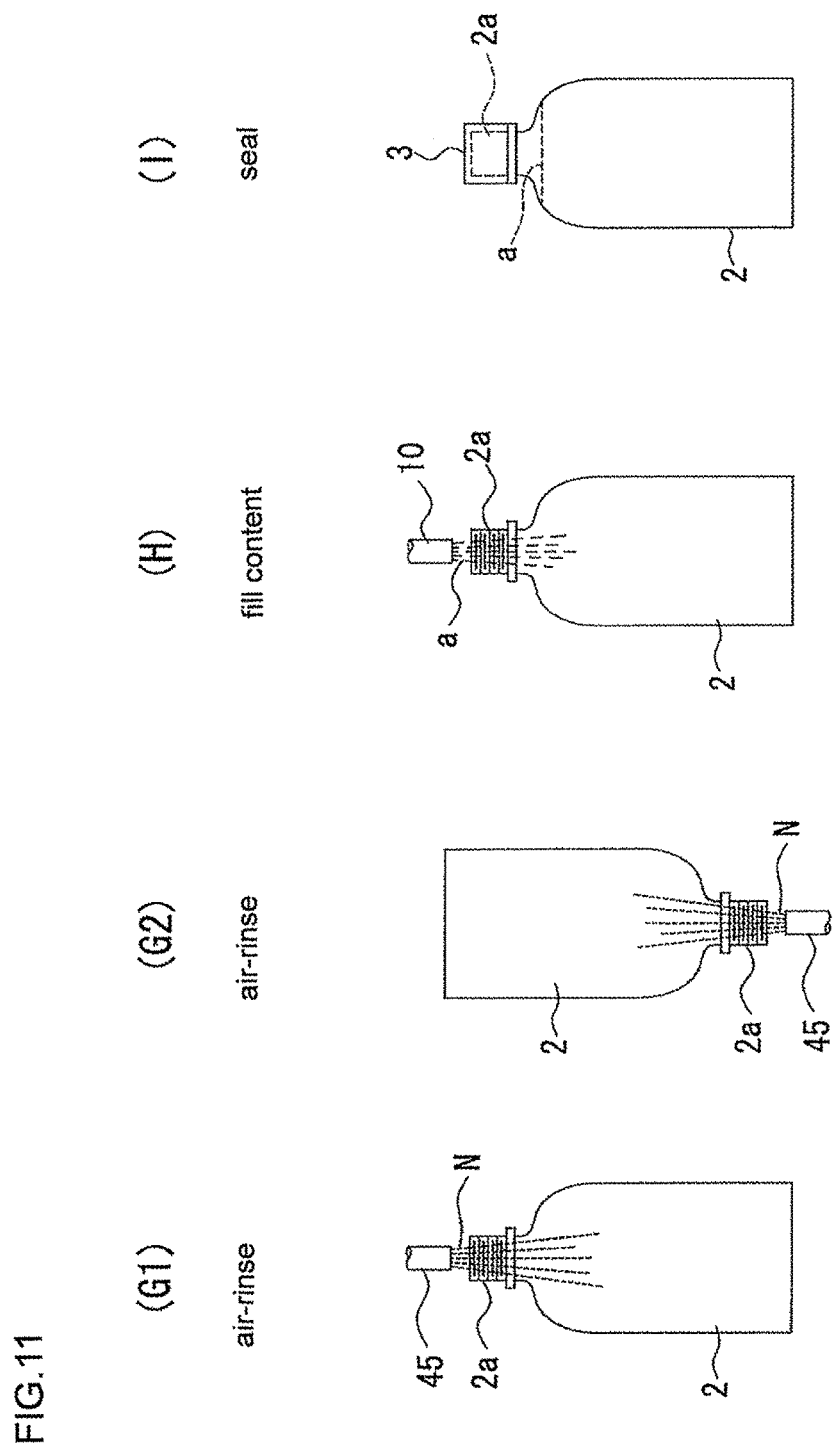
FIG. 11 is an illustration for explaining respective steps G1, G2, H, I of the filling method according to the third embodiment of the present invention.

According to an inline system of the present embodiment 3, it is possible to manufacture a package shown in FIG. 11 (I) as like as that in the case of the first embodiment 1.

Figure 10:
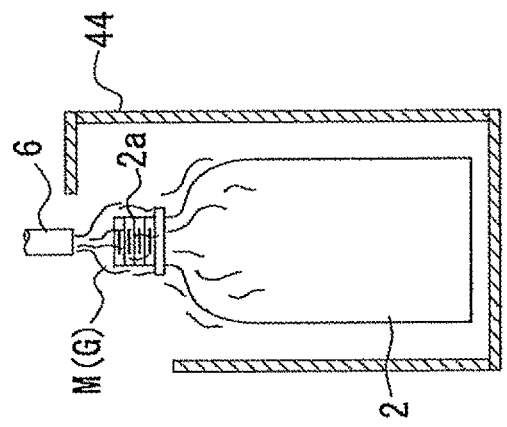
FIG. 10 is an illustration for explaining a step F of a filling method according to a third embodiment of the present invention.

Although this inline system performs the processes identical to those represented in FIG. 1(A) to (C) and FIGS. 2(C) and (E), the process of FIG. 1(B) is made as preliminary sterilization to the bottle 2 in the heating furnace 2 and a process represented in FIG. 10(F) after the process of FIG. 10(E) is performed as main sterilizing process to the bottle 2.

The bottle 2 is subjected to the main sterilizing process as shown in FIG. 10(F) while continuously travelling after the molding process shown in FIG. 2(E). This main sterilizing process is performed by blasting the hydrogen peroxide mist M or gas G as the sterilizing agent through the nozzle 6, which is disposed so as to face the mouth portion 2a of the preform 1. The hydrogen peroxide mist M or gas G flows down from the tip end of the nozzle 6 for the sterilization and enters inside the bottle 2 through the mouth portion 2a of the bottle 2, thereby sterilizing the inner surface thereof.

Furthermore, a tunnel 44 is formed to a portion in which the bottle 2 continuously travels. A part of the hydrogen peroxide mist M or gas G discharged from the nozzle 6 for the sterilization flows down along the outer surface of the bottle 2 and then stays within the tunnel 44, so that the outer surface of the bottle 2 can be further effectively sterilized.

The hydrogen peroxide mist M or gas G may be generated by a mist generator as like as the mist generator 7 shown in FIG. 5.

The mist M shown in FIG. 10(F) is a condensed mist. In a case where gas G is utilized in place of the mist M, a conduit 42 through which hot wind H flows is connected to the front end of a discharge nozzle 9b, as shown in FIG. 5 with two-dot-chain line, the condensed mist M discharged from the discharge nozzle 9b is gasified by the hot wind H, and then, such gas G is flowed to the nozzle 6 for sterilization by means of flexible nozzle or like.

The nozzle 6 for sterilization may be provided to a predetermined position on the bottle conveying path or may be moved in synchronism with the bottle 2.

As shown in FIG. 10(F), the hydrogen peroxide mist M or gas G blasted from the nozzle 6 for sterilization contacts the inner and outer surfaces of the bottle 2, and at that time, heat which had been applied to the state of the preform 1 remains to the bottle 2, and the bottle 2 is maintained at predetermined temperature so as to be effectively sterilized. This predetermined temperature is preferably 40 to 120° C., and more preferably, 50 to 75° C. in the case of the preform 1 being PET, and in the case of less than 40° C., the sterilizing performance is extremely deteriorated. In the case of more than 120° C., the bottle 2 after the molding is contracted, thus being inconvenient.

The bottle 2 is continuously travelled after the blasting of the hydrogen peroxide mist M or gas G, and as shown in FIG. 11, the bottle 2 is subjected to air-rinse treatment. Such air-rinsing process will be performed by blasting aseptic air N into the bottle 2 from a nozzle 45, and the flow of the blasted aseptic air N removes foreign substance, hydrogen peroxide and the like from the interior of the bottle 2. Thereafter, the bottle 2 is moved to have an erected state.

Further, in place of the air-rinsing process shown in FIG. 11(G), an air-rinsing process shown in FIG. 11(G2) may be adopted. In the process shown in FIG. 11(G2), the aseptic air N can be blasted into the bottle 2 from the mouth portion 2a in an inverted state of the bottle 2 to thereby drop the foreign substance or like in the bottle 2 to the outside of the bottle 2. Otherwise, the process shown in FIG. 11(G2) may be performed by blasting the aseptic air N subsequent to the air-rinsing process shown in FIG. 11(G).

As described above, since the bottle 2 is mainly sterilized by the hydrogen peroxide after the pre-sterilization in the state of the preform 1, the amount of the hydrogen peroxide to be used in the main sterilization can be reduced. Accordingly, it is not necessary to perform the rinsing process, using the hot water after the air-rinsing process, for washing out the hydrogen peroxide adhering to the bottle 2. However, there is of course no problem for performing a rinsing process using the aseptic water as occasion demands.

The following hydrogen peroxide mist M or gas G will be used in the main sterilization described above.

1) Case of Using Hydrogen Peroxide Mist M:

In the conventional sterilization in which only the main sterilization was performed, it was necessary to use the hydrogen peroxide, to adhere to the bottle, of an amount of 50 μL to 100 μL per 500 mL bottle (bottle 2). However, in the case of performing the pre-sterilization with pre-heating of the preform 1 as in the present invention, commercially allowable aseptic filling becomes possible by adhering the hydrogen peroxide mist M of an amount of 10 μL to 50 μL per 500 mL bottle (bottle 2).

2) Case of Using Hydrogen Peroxide Gas G:

In the conventional sterilization in which only the main sterilization was performed, it was necessary to blast the hydrogen peroxide gas G having gas-density of 5 mg/L to 10 mg/L to each bottle 2. However, in the case of performing the pre-sterilization with pre-heating of the preform 1 as in the present invention, it becomes possible to perform the commercially allowable aseptic filling by blasting the hydrogen peroxide gas G having gas density of 1 mg/L to 5 mg/L to the bottle 2.

After the air-rinsing process, as shown in FIG. 11(H), the drink "a" fills the bottle 2 from the filling nozzle 10, and as shown in FIG. 11(I), the cap 3 as a lid is applied to the bottle 2 to seal the same.

Then, the bottles 2 made as packages are collected and delivered to a market.

Figure 12:
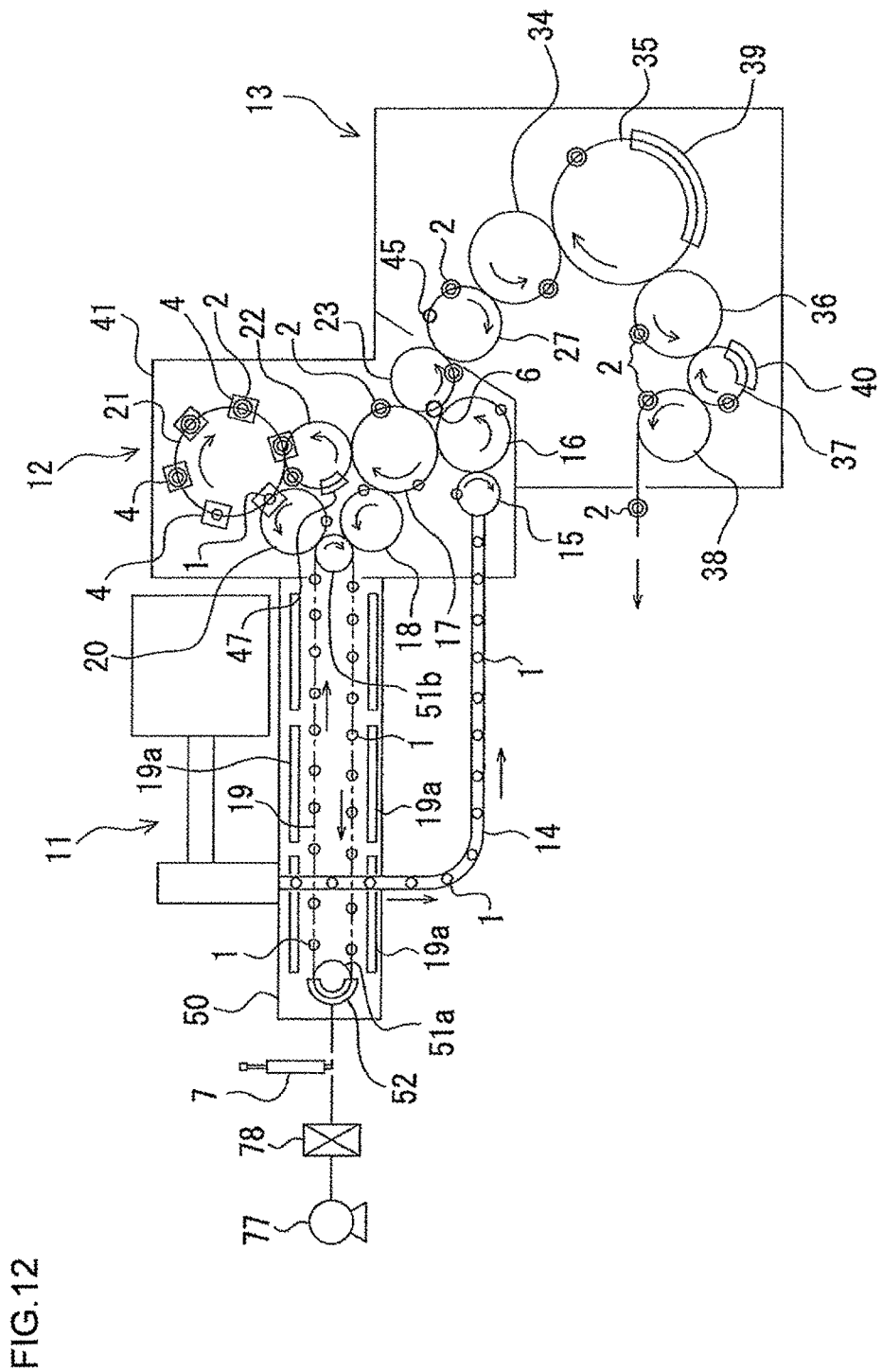
FIG. 12 is a plan view showing a schematic arrangement of one example of a filling apparatus according to the third embodiment.

A filling apparatus for carrying out the filling method mentioned above are configured, for example, as represented by FIG. 12.

As shown in FIG. 12, this filling apparatus has the structure identical to that of the second embodiment 2, but differs in the following points from the first embodiment 1.

That is, in this filling apparatus, processes or steps similar to the processes or steps shown in FIG. 1(B) and FIG. 4 of the first embodiment 1 are performed in the heating furnace as the pre-sterilization process of the preform 1.

When the preform 1 enters the heating furnace 50, the preform 1 is heated for the pre-sterilization on the outward path of the endless chain 19.

The hydrogen peroxide mist M or gas G is blasted into the preform 1 at the terminal end portion of the outward path of the endless chain 19 as shown in FIG. 1(B) and FIG. 4. According to such blasting of the hydrogen peroxide, a thin condensed film of the hydrogen peroxide is formed on the inner surface of the preform 1. Since the preform 1 is preliminarily heated, the hydrogen peroxide adhering to the preform 1 is activated, thereby enhancing the sterilizing effect.

In order to further ensure the pre-sterilization to the preform 1, the sterilizing nozzle 6 (see FIG. 10(F)) for performing the main sterilization to the bottle 2 is arranged on the outer periphery of the wheel 23. The sterilization to the bottle 2 is performed by blasting the hydrogen peroxide mist M or gas G from the sterilizing nozzle 6 with respect to the bottle 2 molded by the mold 4 to thereby sterilize bacteria or like remaining on the surface of the bottle 2. In this process, the heat used for heating the preform remains on the surface of the bottle 2, and according to such heat, the sterilizing effect of the hydrogen peroxide mist M or gas G may be enhanced.

As shown in FIG. 1(A) to (C), the preform 1, in the state of the preform, is preliminarily heated and sterilized, and almost all bacteria or like microorganisms, except those adhering to the mouth portion 2a of the preform 1, can be sterilized by such pre-sterilization. Accordingly, bacteria or like microorganisms alive in the state of the preform 1 even by the blasting of such hydrogen peroxide mist M or gas G and small amount of bacteria or like microorganisms mixed in the blow-molding process and conveying process can be sterilized in the main sterilization process.

In the main sterilization process by the hydrogen peroxide mist M or gas G, since the bottle 2 is preliminarily sterilized in the state of the preform 1, less amount of the hydrogen peroxide to be used is required.

The molded bottle 2 is taken out of the mold 4 by the gripper of the wheel 22 after opening the mold 4, and then inspected to know whether any defect or damage occurs or not in the molding process by the inspection device 47. Thereafter, the bottle 2 is subjected to the main sterilization as shown in FIG. 10(F) during the travelling around the outer periphery of the wheel 23, and is blasted with the hydrogen peroxide gas G or mist M from the sterilizing nozzle 6.

Since the heat applied in the heating furnace 50 remains on the surface of the bottle 2, the bottle 2 is effectively sterilized by the hydrogen peroxide gas G or mist M blasted from the sterilizing nozzle 6. According to such sterilization, the bacteria or like remaining alive on the surface of the preform 1 can be sterilized.

The thus molded and sterilized bottle 2 travels from the wheel 23 to the downstream side wheel 27, and is blasted with the aseptic air N from the nozzle 45 as shown in FIG. 11(G1) or (G2) around the wheel 27, thus being subjected to the air-rinsing process.

Thereafter, the bottle 2 is travelled in the filling apparatus and then transferred to the train of the wheels 34, 35, 36, 37 and 38.

In the filling machine 13, the bottle 2 is filled up with the drink "a" subjected to the sterilizing treatment by the filling nozzle 10 of the filler 39 as shown in FIG. 11(H). The bottle 2 filled up with the drink "a" is applied with the cap 3 by the capper 40 to be sealed (see FIG. 11(I)), and then, discharged through the outlet of the chamber 41.

Embodiment 4

In the embodiment 3, although the pre-heating to the preform 1 (see FIG. 1(A)) is performed in the heating furnace 50, in this embodiment 4, as like as in the embodiment 2, the pre-heating to the pre-sterilization temperature of the preform 1 shown in FIG. 6(A) and the pre-sterilization shown in FIG. 6(B) are performed just before the introduction of the preform 1 into the heating furnace 50.

That is, as shown in FIGS. 6(A) and (B), the preform 1 is pre-heated to the preliminary sterilization temperature by supplying the hot air H from the nozzle 80, and then, the hydrogen peroxide mist M or gas G is blasted from the nozzle 81, thus performing the preliminary sterilization. According to such operation, almost all the bacteria or microorganisms adhering to the preform 1, except those adhering to the mouth portion 2a of the preform, can be sterilized.

The pre-sterilized preform 1 is heated in the heating furnace 50 as shown in FIG. 6(C), to the temperature suitable for the molding process, blow-molded into the bottle 2 in the mold 4 as shown in FIG. 7(D), and the bottle 2 is then taken out of the mold 4.

Figure 13:
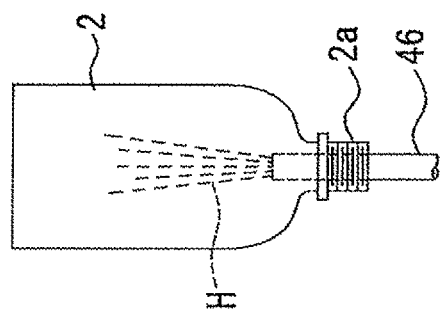
FIG. 13 is an illustration for explaining a step F of a filling method according to a fourth embodiment of the present invention.

The bottle 2 taken out of the mold 4 is subjected to the main sterilization by the hot water rinsing process using the aseptic hot water H as shown in FIG. 13(F). In FIG. 13(F), reference numeral 46 denotes a hot water rinsing nozzle for blasting the aseptic hot water H into the bottle 2. The temperature of the hot water H is maintained in a temperature range at which the bottle 2 is not deformed.

The bottle 2 is preheated to a temperature suitable for preliminary sterilization in the state of the preform 1, and the preliminary sterilization is then performed by blasting the hydrogen peroxide mist M or gas. Accordingly, bacteria or like remaining alive after the molding of the bottle 2 is subjected to the sterilization treatment in the hot rinsing process.

Figure 14:
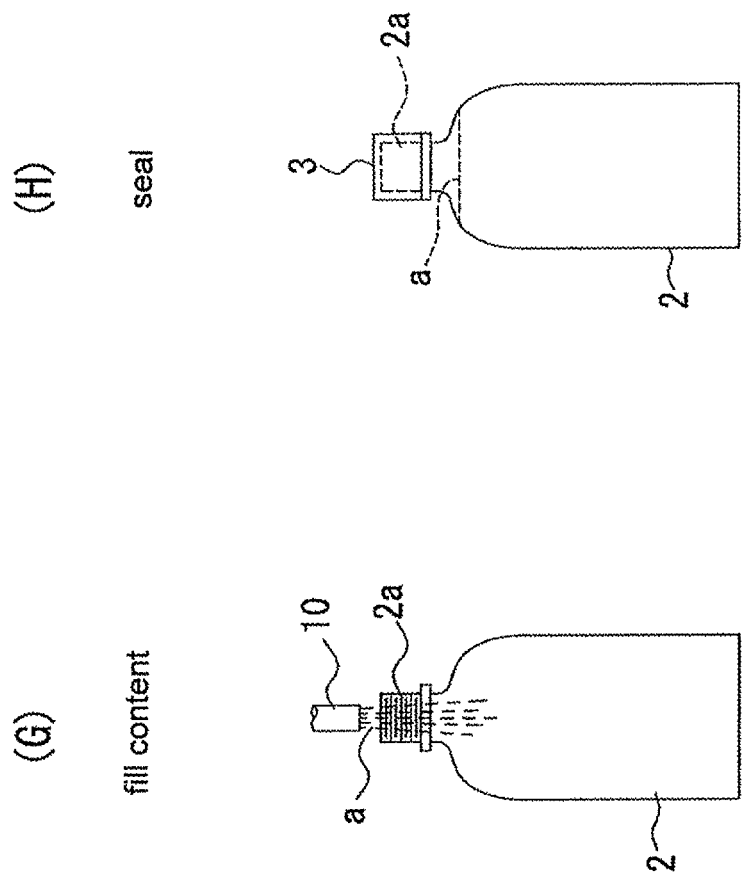
FIG. 14 is an illustration for explaining respective steps G, H of the filling method according to the fourth embodiment of the present invention.

The bottle 2 after the hot rinsing is filled up with the drink "a" as shown in FIG. 14(G), and the cap 3 is then applied as shown in FIG. 14(H).

The filling method of the present embodiment 4 is suitable for producing drinks, which is not required to sterilize spore forming bacteria, such as acidic drink other than low-acidic drink, carbonated drink, mineral water or like.

Figure 15:
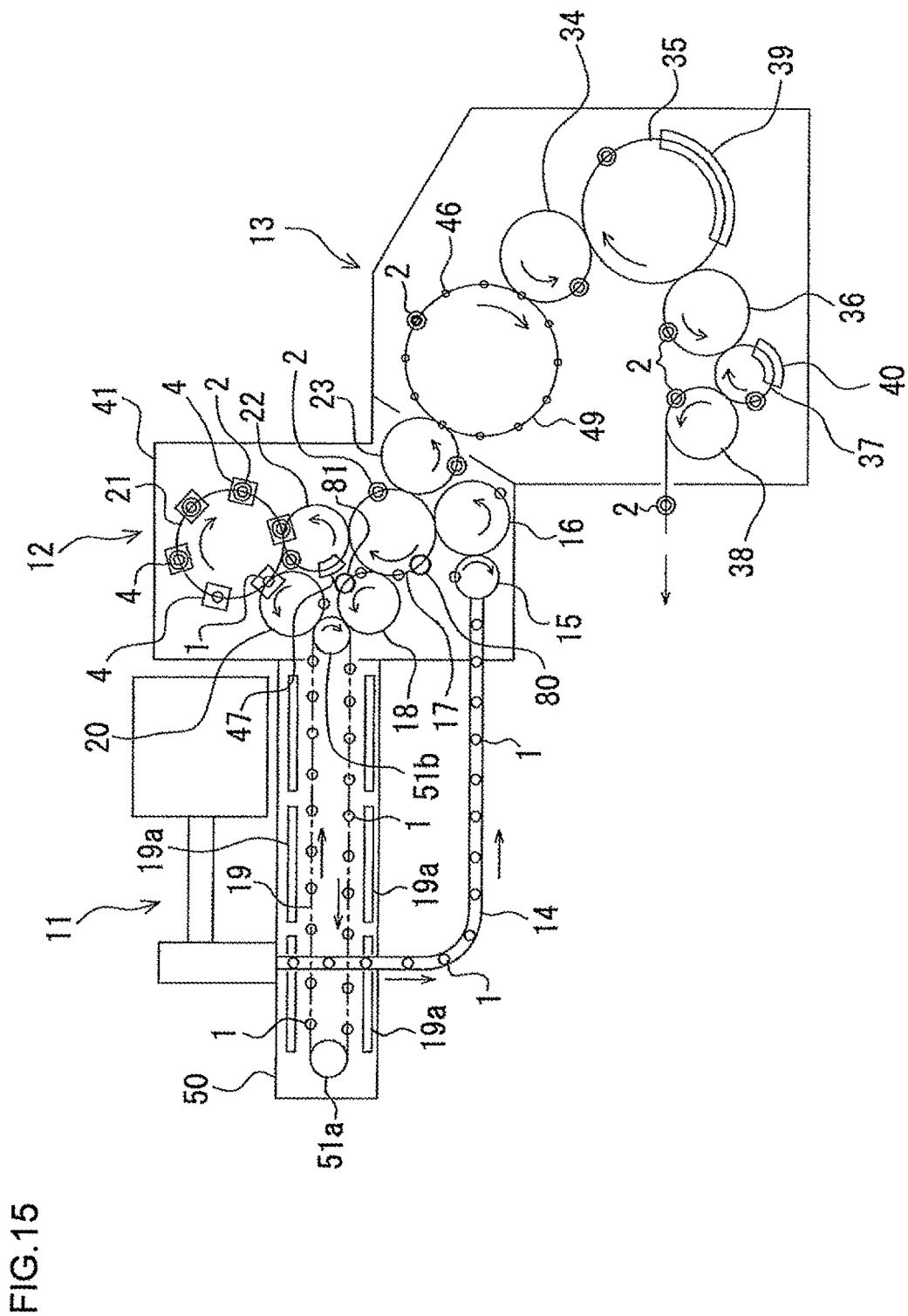
FIG. 15 is a plan view showing a schematic arrangement of one example of a filling apparatus according to the fourth embodiment.

As shown in FIG. 15, the filling apparatus for performing the filling method of this fourth embodiment 4 is provided with a nozzle 80 for discharging the hot air P as means for preheating the preform 1 at a portion in the vicinity of the wheel 17 arranged outside the heating furnace. As shown in FIG. 6(A), the hot air P discharged from the nozzle 80 is blasted toward the interior of the preform 1 through the mouth portion 2a thereof to thereby preheat the inner surface of the preform 1.

Further, it may be possible to arrange a plurality of nozzles 80 for discharging the hot air P. That is, as shown in FIGS. 9(A) and (B), it may be possible to dispose a manifold 82 so as to extend along the circular-arc shape of the wheel 17 and to mount a number of nozzles 80 to the lower surface of the manifold so as to extend along the circular-arc shape of the wheel 17. The nozzles 80 may be formed as small holes perforated to the lower surface of the manifold 82. The hot air P supplied inside the manifold 82 is blasted out of the respective nozzles 80, and the row of the preforms 1 travel below the row of these nozzles 80 with the mouth portions 2a being directed upward. According to such operation, the hot air P discharged from the respective nozzles 80 is blasted into the respective preforms 1 through the mouth portions 2a thereof, thus preheating the inner surfaces of the preforms 1.

Herein, a nozzle 81 for discharging the hydrogen peroxide mist M or gas as means for preliminarily sterilizing the preform 1 is provided in the vicinity of the wheel 18 arranged outside the heating furnace 50. As shown in FIG. 6(B), a part of the hydrogen peroxide mist M or gas discharged from the nozzle 81 flows into the preform 1 through the mouth portion 2a thereof and other part thereof contacts and flows down along the outer surface of the preform 1 to thereby preliminarily sterilize the inner and outer surfaces of the preform 1.

Furthermore, in the filling machine 13 of the filling apparatus, a wheel 49 for the hot rinsing process is provided in place of the wheel 27 in the first embodiment 1. Around the wheel 49, the nozzles 46 for discharging the hot water H shown in FIG. 13(F) are arranged together with grippers, not shown, at a predetermined interval. The gripper of the wheel 49 is disposed to be vertically invertible, and travels as shown in FIG. 13(F) with the bottle 2 shown in FIG. 7(E) being in a vertically inverted state. The nozzle 46 is inserted into the bottle 2 through the mouth portion 2a of the bottle 2 while travelling in synchronism with the travelling of the gripper and the bottle 2, and discharges the hot water H into the bottle 2. The hot water H fills the interior of the bottle 2, and after the sterilization of the inner surface of the bottle 2, the hot water H flows out of the bottle 2 through the mouth portion 2a thereof.

After the hot water rinsing process, the bottle 2 is filed up with the drink "a" through the filling nozzle 10 of the filler 39 while being travelled around the wheel 35 (FIG. 14(G)). The bottle 2 filled up with the drink "a" is applied and sealed with the cap 3 by the capper 40 as shown in FIG. 14(H) and then discharged out of the filling apparatus.

As to the structures or configurations other than those mentioned above of the fourth embodiment 4, like reference numerals are added to the structures or members corresponding to those mentioned with reference to the first to third embodiments 1 to 3 to thereby avoid the duplicate explanations herein.

It is further to be noted that the present invention is not limited to the embodiments described above and may be carried out by many other various embodiments or modes. For example, a container to which the present invention is applied is not limited to a PET bottle, and many other containers made of resin may be usable. Moreover, the molding process may be performed without being limited to the injection blow molding, and various other blow-molding process such as direct blow process may be adopted. Furthermore, the conveying means for conveying the preform and the container is not limited to the illustrated wheel conveying apparatus, and various conveying means capable of sequentially conveying the formed containers at a predetermined speed, for example, belt conveyer, bucket conveyer, pneumatic (air) conveyer and the like may be also utilized.

Still furthermore, in the described embodiments, although the main sterilization is performed by using the hydrogen peroxide or hot water, the main sterilization may be performed by blasting peracetic acid, in place of hydrogen peroxide, to the bottle, or irradiating the bottle with electron beam or ray.

EXPLANATION OF REFERENCE NUMERALS

1—preform
2—bottle
3—cap
4—mold
6—nozzle for main sterilization
19—endless chain
39—filler
40—capper
43a—through hole of spindle
45—nozzle for air rinsing
46—nozzle for hot water
50—heating furnace
81—nozzle for sterilization
"a"—drink
G—hydrogen peroxide gas
H—aseptic hot water
M—hydrogen peroxide mist
N—aseptic air

The invention claimed is:
1. A drink filling method comprising the steps of:
preheating a preform, blasting a hydrogen peroxide mist or gas to an inner surface of the preheated preform through a hole formed through a shaft core of a spindle, the spindle being inserted into a mouth portion of the preform and suspends the preform and rotates the preform according to a rotation of the spindle during traveling in a heating furnace, and to an outer surface of the preheated preform from a nozzle, and further heating the preform to a temperature suitable for molding the preform, the preheating and the further heating being performed in a state of the preform being continuously travelled;
molding the preform into a container in a blow-molding mold which is also travelling together;
taking the container out of the blow-molding mold; and filling the container with a drink and then sealing the container with a cap while the container being continuously travelled,
wherein said steps of preheating the preform and further heating the preform to the temperature suitable for molding the preform are performed within the heating furnace having a furnace room extending in a first direction,
inside the furnace room, an endless chain is stretched between a pair of pulleys arranged oppositely in a horizontal plane, the endless chain constituting an endless conveyer forming a preform conveying path in the heating furnace, together with associated members that convey a number of preforms in a suspended state,
infrared heaters are attached to an inner wall surface of the furnace room along an outward path and a return path,
a hydrogen peroxide dispenser configured to blast the hydrogen peroxide mist or gas to the preform is further disposed at a substantially middle portion of the preform conveying path in the heating furnace, at a position in the vicinity of one pulley, and
when the preform is conveyed into the heating furnace, the preform is preheated to 40 to 80° C. by the infrared heaters while being conveyed along the outward path of the endless chain.

2. A drink filling method comprising the steps of:
preheating a preform to a temperature suitable for preliminary sterilization, blasting a hydrogen peroxide mist or gas to an inner surface of the preheated preform through a hole formed through a shaft core of a spindle, the spindle being inserted into a mouth portion of the preform and suspends the preform and rotates the preform according to a rotation of the spindle during traveling in a heating furnace, and to an outer surface of the preheated preform from a nozzle to perform the preliminary sterilization thereof, and further heating the preform to a temperature suitable for molding the preform, the preheating and the further heating being performed under a state of the preform being continuously travelled;
molding the preform into a container in a blow-molding mold which is also travelling together;
taking the container out of the blow-molding mold;
performing a main sterilization to the container taken out of the mold while being continuously travelling; and
filling the mainly sterilized container with a drink and then sealing the container with a cap while the container being continuously travelled,
wherein said steps of preheating the preform and further heating the preform to the temperature suitable for molding the preform are performed within the heating furnace having a furnace room extending in a first direction,
inside the furnace room, an endless chain is stretched between a pair of pulleys arranged oppositely in a horizontal plane, the endless chain constituting an endless conveyer forming a preform conveying path in the heating furnace, together with associated members that convey a number of preforms in a suspended state,
infrared heaters are attached to an inner wall surface of the furnace room along an outward path and a return path,
a hydrogen peroxide dispenser configured to blast the hydrogen peroxide mist or gas to the preform is further disposed at a substantially middle portion of the preform conveying path in the heating furnace, at a position in the vicinity of one pulley, and when the preform is conveyed into the heating furnace, the preform is preheated to 40 to 80° C. by the infrared heaters while being conveyed along the outward path of the endless chain.

3. The drink filling method according to claim 2, wherein the main sterilization is performed by blasting a hydrogen peroxide mist or gas to the container while the container retains heat from heating the preform, and an air-rinsing is then performed by an aseptic air.

4. The drink filling method according to claim 2, wherein the main sterilization is performed by rinsing the container with hot water.

5. A drink filling apparatus comprising:
a conveying path that continuously conveys a preform or container until the preform is molded into the container, the container is filled with a drink, and the container is sealed with a lid;
a heating furnace that heats the preform to a temperature suitable for molding the preform, the heating furnace having a furnace room extending in a first direction, inside the furnace room, an endless chain being stretched between a pair of pulleys arranged oppositely in a horizontal plane, the endless chain constituting an endless conveyer forming a preform conveying path in the heating furnace, together with associated members, that conveys a number of preforms in a suspended state, infrared heaters being attached to an inner wall surface of the furnace room along an outward path and a return path;
a mold that performs blow-molding of the preform heated to the temperature for molding the preform;
a filler that fills the container with the drink;
a capper that seals the container filled with the drink, the heating furnace, the mold, the filler, and the capper being arranged along the conveying path; and
a hydrogen peroxide supplier configured to blast a hydrogen peroxide mist or gas to the preform that is further disposed at a substantially middle portion of the preform conveying path in the heating furnace, at a position in the vicinity of one pulley,
wherein the preform is preheated and then is subjected to blasting of the hydrogen peroxide mist or gas to an inner surface of the preheated perform through a hole formed through a shaft core of a spindle, the spindle being is inserted into a mouth portion of the preform and suspends the preform and rotates the preform according to a rotation of the spindle during traveling in the heating furnace, and to an outer surface of the preheated preform from a nozzle at a first half conveying path in the heating furnace, and
the preform is then heated to the temperature suitable for the molding at a latter half conveying path.

6. A drink filling apparatus comprising:
a conveying path that continuously conveys a preform or container till the preform is molded into the container, the container is filled with a drink and the container is sealed with a lid;
a heating furnace that heats the preform to a temperature suitable for molding the preform, the heating furnace having a furnace room extending in a first direction, wherein inside the furnace room, an endless chain is stretched between a pair of pulleys arranged oppositely in a horizontal plane, wherein the endless chain constitutes an endless conveyer forming a preform conveying path in the heating furnace, together with associated members, that conveys a number of preforms in a suspended state, and wherein infrared heaters are attached to an inner wall surface of the furnace room along an outward path and a return path;
a mold that performs blow-molding of the preform heated to the temperature for molding the preform;
a main sterilizing system that mainly sterilizes the blow-molded container;
a filler that fills the mainly sterilized container with the drink;
a capper that seals the container filled with the drink, the heating furnace, the mold, the main sterilizing means, the filler and the capper being arranged along the conveying path; and
a hydrogen peroxide supply system configured to blast a hydrogen peroxide mist or gas to the preform that is further disposed at a substantially middle portion of the preform conveying path in the heating furnace,
wherein the preform is preheated to thereby preliminarily sterilize by being blasted with the hydrogen peroxide mist or gas to an inner surface of the preheated perform through a hole formed through a shaft core of a spindle, the spindle being inserted into a mouth portion of the preform and suspends the preform and rotates the preform according to a rotation of the spindle during traveling in the heating furnace, and to an outer surface of the preheated preform from a blasting nozzle at a first half conveying path in the heating furnace, and the preform is then heated to the temperature suitable for the molding at a latter half conveying path.

7. The drink filling apparatus according to claim 6, wherein the main sterilizing system includes a sterilizing nozzle that blasts a hydrogen peroxide condensed mist or gas to the container to which heat at the time of heating the preform remains, and an air-rinsing nozzle that performs air-rinsing to the container to which the hydrogen peroxide condensed mist or gas is blasted by blasting aseptic air.

8. The drink filling apparatus according to claim 6, wherein the main sterilizing system includes a hot-water rinsing nozzle configured to blast hot water to the container to which heat at the time of heating the preform remains by blasting aseptic hot water.

* * * * *